United States Patent [19]

Hashimoto et al.

[11] Patent Number: 4,891,241

[45] Date of Patent: Jan. 2, 1990

[54] METHOD OF INCREASING THE DYNAMICAL STRENGTH OF GLASS CONTAINER

[75] Inventors: Yutaka Hashimoto, Sakai; Masanobu Yumoto, Izumi; Toshihiko Umaba, Takaishi; Yutaka Kamada; Tsutomu Matsubara, both of Nishinomiya; Sigeo Kawaguchi, Osaka, all of Japan

[73] Assignees: Dainippon Ink & Chemicals, Inc., Tokyo; Yamamura Glass Co., Ltd., Hyogo, both of Japan

[21] Appl. No.: 187,365

[22] Filed: Apr. 28, 1988

[30] Foreign Application Priority Data

Apr. 28, 1987 [JP] Japan .................................. 62-103074

[51] Int. Cl.$^4$ ............................................. B05D 3/06
[52] U.S. Cl. .................................... 427/44; 427/54.1; 427/302; 427/407.2
[58] Field of Search .................... 427/54.1, 407.2, 302, 427/44

[56] References Cited

U.S. PATENT DOCUMENTS

| | | | |
|---|---|---|---|
| 3,922,436 | 11/1975 | Bell et al. | 427/229 |
| 4,084,021 | 4/1978 | Sandvig | 427/54.1 |
| 4,264,658 | 4/1981 | Tobias | 427/54.1 |
| 4,287,227 | 9/1981 | Kamada et al. | 427/54.1 |
| 4,371,566 | 2/1983 | Russell | 427/54.1 |
| 4,451,329 | 5/1984 | Batchelor et al. | 428/417 |
| 4,749,614 | 6/1988 | Andrews et al. | 427/407.3 |
| 4,756,972 | 7/1988 | Kloosterboer et al. | 156/660 |

*Primary Examiner*—Janyce Bell
*Attorney, Agent, or Firm*—Sherman and Shalloway

[57] ABSTRACT

A method of increasing the pressure-resistant strength and impact strength of a glass container, which comprises treating the surface of the glass container with a silane coupling agent, applying a coating material comprising a reactive compound having at least two (meth)acryloyl groups in the molecule to the treated glass container, and subjecting it to irradiation of an activated energy ray to cure the coating material applied; and a method of increasing the pressure-resistant strength and impact strength of a glass container, which comprises applying a coating material comprising a silane coupling agent and a reactive compound having at least two (meth)acryloyl groups in the molecule to the surface of the glass article, and then subjecting the coated glass container to irradiation of an activated energy ray to cure the coating.

17 Claims, No Drawings

METHOD OF INCREASING THE DYNAMICAL STRENGTH OF GLASS CONTAINER

This invention relates to a method of increasing the dynamical strength of a glass container, and more specifically, to a method of increasing the pressure-resistant strength and impact strength of a glass container by coating a glass surface with a coating material which cures by irradiation of activated energy rays.

Generally, glass has been used in many fields, for example, as containers, such as bottles or cups, for holding foods and drugs, decorative articles, and scientific experimental instruments by taking advantage of its transparency, lusterous feel, high light resistance and chemical resistance. Inherently, however, glass is heavier than plastics and has inferior flexibility and impact resistance. It has dynamical defects in that it is more brittle and has lower impact strength than metals. Glass bottles are susceptible to breakage by external i-mpact or by the internal pressure of a liquid filled therein under pressure, and the broken fragments of glass scatter and may cause injury. Hence, its utility has been limited as compared with plastic containers or matallic containers.

Means have therefore been already proposed by attaching an additional value to glass by increasing its impact strength or preventing its scattering at the time of breakage by forming a protective resin film on glass articles such as bottles or attaching a protective supporting material.

For example, the following prior techniques have been proposed heretofore.

(1) Prevention of scratching of glass and scattering of glass fragments at the time of breakage by coating a photocurable resin on the outside surface of glass articles such as bottles (for example, Japanese Laid-Open Patent Publications Nos. 102711/1974 and 140267/1984, and GB No. 2073050.

(2) Prevention of glass scattering and increasing of impact strength by coating the surface of glass with a synthetic resin having excellent adhesion (for example, U.S. Pat. No. 3,823,032 and Japanese Laid-Open Patent Publication No. 191036/1985).

(3) Prevention of glass scattering and increasing of impact strength by forming a laminated glass structure during a photocurable resin composition (for example Japanese Laid-Open Patent Publications Nos. 223257/1984 and 7352/1986).

These proposed methods are effective for preventing scattering of glass fragments, but only serve to relax impact forces and to inhibit degradation of the dynamical strength of glass by forming a coating on a glass surface and thus preventing scratching. They do not increase the pressure-resistant strength and impact strength of glass articles such as bottles. According to these methods, it is impossible to reduce the thickness of glass and thus the weight of glass bottles while maintaining pressure-resistant strength and impact strength.

Accoordingly, no method has yet been developed by which the pressure-resistant strength and impact strength of a glass bottle are increased by coating a resin on it, and the thickness and weight of the glass bottle are reduced without a reduction in these dynamical strengths.

The present inventors made extensive investigations in order to solve the above problems of the prior art, and have now found that when a specific coating material is applied to a glass container treated with a silane coupling agent, or the coating material having the silane coupling agent mixed with it is applied to the glass container, and then the coating is subjected to irradiation of activated energy rays, a coated film having excellent adhesion is formed, and even if the coated film has a thickness on the micron order, it can markedly increase the pressure-resistant strength and impact strength of the glass container simultaneously.

Thus, according to this invention, there is provided a method of increasing the pressure-resistant strength and impact strength of a glass container, which comprises [1] treating the surface of a glass container with a silane coupling agent and then applying a coating material comprising at least one reactive compound having at least two (meth)acryloyl groups in the molecule to the glass container and subjecting the coated container to irradiation of an activated energy ray to cure the coating, or [2] applying a coating material comprising a silane coupling agent on a glass container and then subjecting the coated container to irradiation of an activated energy ray to cure the coating.

There are two embodiments [1] and [2] in the method of this invention.

Treatment with the silane coupling agent in the embodiment [1] is usually carried out by coating it directly, or in the form of a solution in purified water such as distilled water or deionized water and/or an organic solvent, on the glass container.

In the latter procedure, the concentration of the silane coupling agent in the solution may be at least 0.01% by weight. Preferably, the solution is used in coating after it is stirred at room temperature for at least 5 minutes.

The solvent is used herein to control the viscosity and coatibility of the coating material to be described and the thickness of the coated film, and may be any solvent which can dissolve the silane coupling agent used, and may preferably dissolve in purified water.

In the treatment of the glass container with the solution of the silane coupling agent by the latter procedure, it is preferred to adjust the pH of the solution. The pH is especially preferably adjusted to the range of 3 to 5 in order to impart good adhesion to the resin coated on the glass and increase the pressure-resistant strength and impact strength of the glass bottle.

The amount of the silane coupling agent solution may be at least 1 mg, preferably 1 to 100 mg, per $m^2$ of the surface of the glass container.

In the embodiment [2] the silane coupling agent is mixed with a reactive compound containing at least two (meth)acryloyl groups in the molecule to form a coating material, and the coating material is applied to the glass container. The content of the silane coupling agent in the coating material is 0.01 to 30% by weight, and preferably 0.01 to 10% by weight from the standpoint of strength and economy.

The present inventors have found that a product obtained by applying a coating material containing the silane coupling agent to a glass container to irradiation of an activated energy ray in accordance with the embodiment [2] has of course increased pressure-resistant strength and impact strength. When the glass container is to be used under severe conditions, for example under exposure to hot water and/or hot alkaline water, the coating material preferably has an acid value of 0.01 to 100 in order to increase adhesion to glass and the pressure-resistant strength and impact strength of the glass container.

The acid value, as used herein, means the number of millligrams of potassium hydroxide required to neutralize acids contained in 1 gram of the coating material.

To adjust the pH or acid value of the coating material in the embodiments [2] and [2], and available acids, bases, buffers, etc. can be used. Such components may be, for example, acid groups bonded to a reactive compound (II) to be described or a dilutinng monomer (III) to be described, or (meth)acrylic acid generated from it on decomposition, or may be an organic acid or a mineral acid freshly added.

Examples of suitable acids include compounds formed by addition of succinic anhydride or phthalic anhydride to the hydroxyl groups of reactive compounds to be described containoing the hydroxyl group in the molecule [for example (II)- (g) to (j)], compounds (III)-1 or (III)-37 to be described, a compound of the formula

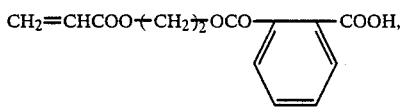

a compound of the formula Ch½acetic acid, fatty acids containing alkyl groups with 2 to 18 carbon atoms, methanesulfonic acid, alkylsulfonic acids containing alkyl groups with 2 to 18 carbon atoms, trifluoromethanesulfonic acid, p-toluenesulfonic acid, benzoic acid, phthalic acid, formic acid, lactic acid, cinnamic acid, hydrochloric acid, sulfuric acid, nitric acid and perchloric acid.

Examples of suitable bases are amines, lithium hydroxide, potassium hydroxide and sodium hydroxide.

Application of the silane coupling agent and the coating material in this invention to a glass container may be effected by various methhods known in the art, for example, coating by a brush, and applicator, a bar coater, a roller brush or a roll coater, spray coating by an air spray or airless spray coater, flow coating by a shower coater or a curtain flow coater, dipping, and spinner coating. These methods are desirably selected according to the shape or the use of the glass container.

When the silane coupling agent or the coating material is coated on or impregnated in the glass container as a solution in a solvent, it is necessary to provide a step of drying the solvent at room temperature or under reduced pressure or by heating.

The present inventors have found that irrespective of the presence of solvent, heating after coating the silane coupling agent and/or the coating material furter increases the adhesion of the cured resin coating to glass and the dynamical strengths such as pressure-resistant strength and impact strength. Heating of the coated silane coupling agent and/or coating material may be carried out by utilizing the remaining heat of the glass container which has previously heated; applying hot air; introducing the coated container in an oven; using a far infrared heater; or using microwaves. Preferably, the heating temperature is 40 to 120° C., and the heating time is 10 seconds to 1 hour. When the solvent is to be removed from the coating material by heating, it is preferably carried out at 50° to 80° C. for 10 seconds to 1 hour in order to prevent thermal polymerization of the monomer.

The coating material applied to the surface of the glass container is polymerized and cured by irradiation of activated energy rays by using ultraviolet light from such a light source as a sterilizing lamp, and ultraviolet-emitting fluorescent lamp, a carbon arc, a xenon lamp, a high-pressure mercury lamp for copying, a medium-or high-pressure mercury lamp, or electron beams from a scanning-type or curtain-type electron beam accelerator. Ultraviolet curing of a coated layer having a thickness of not more than 1 micrometer is carried out preferably in an atmosphere of an inert gas such as nitrogen gas in order to perform the polymerization efficiently.

In order to produce the effect of increasing the dynamical strength of glass containers by the method of this invention, the thicknes of the cured resin coating including the silane coupling agent coating is preferably at least 0.5 micrometer. In order to maintain a cured coating being tough and having excellent adhesion and retain the initial dynamical strengths even after washing with hot alkaline water and/or hot water, the thickness of the cured resin coating including the silane coupling agent coating is preferably 2 to 200 micrometers, especially preferably 2 to 30 micrometers.

The silane coupling agent (I) in accordance with this invention is an orgranosilicon monomer having at least two different reactive groups in the molecule. One of the reactive groups is a group capable of reacting with glass such as a methoxy, ethoxy or silanol group, and another reactive group is a group capable of reacting with the (meth)acryloyl gourp, such as a vinyl, methacryloyl, acryloyl, epoxy, amino or mercapto group.

Specific examples of the silane coupling agents (I) include the following.

(I)-1: $CH_2=CHSiCl_3$ (I)-2: $CH_2=CHSi(OCH_3)_3$ (I)-3: $CH_2=CHSi(OC_2H_5)_3$ (I)-4: $CH_2=CHSi(OCH_3)_2$
            $|$
            $CH_3$ (I)-5: $CH_2=CHSi(OCH_2CH_2OCH_3)_3$ (I)-6: $H_2NCH_2CH_2NHCH_2CH_2CH_2Si(OCH_3)_2$
                                         $|$
                                         $CH_3$ (I)-7: $H_2NCH_2CH_2NHCH_2CH_2CH_2Si(OCH_3)_3$ (I)-8: $H_2NCH_2CH_2CH_2Si(OC_2H_5)_3$ (I)-9: $CH_2=CHCH_2NHC_2H_4NHC_3H_6Si(OCH_3)_3$ (I)-10: $CH_2=CHCH_2NHC_3H_6Si(OCH_3)_3$

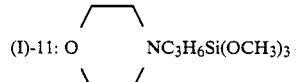

(I)-11: O    $NC_3H_6Si(OCH_3)_3$

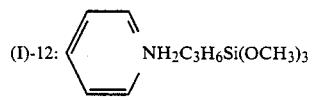

(I)-12:    $NH_2C_3H_6Si(OCH_3)_3$ $CH_3$
             $|$
(I)-13: $CH_2=CCOOC_3H_6Si(OCH_3)_3$ $CH_3$
             $|$
(I)-14: $CH_2=CCOOC_3H_6Si(OCH_3)_2$
                                    $|$
                                    $CH_3$

-continued (I)-15: $CH_2=CHCOOC_3H_6Si(OCH_3)_3$ (I)-16: $CH_2=CHCOOC_3H_6Si(OCH_3)_2$
             |
             $CH_3$

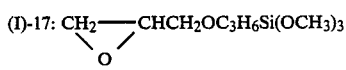
(I)-17:

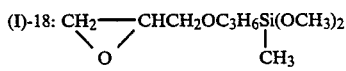
(I)-18:

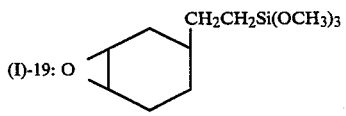
(I)-19:

(I)-20: $ClCH_2CH_2CH_2Si(OCH_3)_2$
             |
             $CH_3$ (I)-21: $ClCH_2CH_2CH_2Si(OCH_3)_3$ (I)-22: $HSCH_2CH_2CH_2Si(OCH_3)_3$

Compounds obtained by hydrolyzing these compounds by methods known in the art to change part or whole of the alkoxy groups to silanol groups may also be used as silane coupling agents (I) in this invention.

Those having an unsaturated double bond are preferred. Those havign a (meth)acryloyl group as shown in (I)-13 to (I)-16 are especially preferred.

It should be understood that the silane coupling agents in accordace with this invention should not at all be limited by the specific examples given above.

The reactive compound (II) in accordance with this invention is essential for developing strengthh in the cured resin obtained by irradiation of activated energy rays. It may be any of those compounds known in the art which contain at least two (meth)acryloyl groups in the molecule.

The proportion of the reactive commpound (II) in the coating material used in this invention may be 100% excepting a photoinitiator in any of the embodiments [1] and [2], but is usually 5 to 95%. Preferably, it is 10 to 90% from the standpoint of the toughness of the cured resin coating and the curability of the coating.

The reactive compound (II) includes, for example, compounds normally called polyfunctional (meth)acrylates in the art and compounds called prepolymers, base resins, oligomers and acrylic oligomers. Specific examples include the following.

(II)-(i): Polyhydric (meth)acrylates resulting from bonding of at least 2 (meth)acrylic acids to polyester hydric alcohols.

(II)-(ii): Polyester acrylates resulting from bonding of at least wo (meth)acrylic acids to polyester polyols obtained by the reaction of polyhydric alcohols and polybasic acids.

Examples of the polyhydric alcohols in (i) and (ii) include ethylene glycol, 1,4-butanediol, 1,6-hexanediol, diethylene glycol, trimethylolpropane, dipropylene glycol, polyethylene glycol, polypropylene glycol, pentaerythritol, dipentaerythritol, bisphenol A and 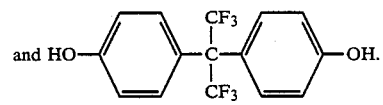

Ethylene oxide-modified polyhydric alcohols and propylene oxide-modified polyhydric alcohols formed by addition-reaction of ethylene oxide or propylene oxide with those compounds are also included within the polyhydric alcohols referred to herein. Examples of the polybasic acids are phthalic acid, adipic acid, maleic acid, trimellitic acid, itaconic acid, succinic acid, terephthalic acid and alkenylsuccinic acids.

(II)-(iii): Epoxy-modified (meth)acrylates obtained by esterifying the epoxy groups of epoxy resins with (meth)acrylic acid to form (meth)acryloyl groups as functional groups.

The epoxy resins may be, for example, bisphenol A-epichlorohydrin type, phenol novolak-epichlorohydrin type and polyhydric alcohol-epichlorohydrin type alicyclic resins.

(II)-(iv): Polyurethane acrylates obtained by reacting polyvalent isocyanate groups with hydroxyl group-containing (meth)acrylate.

The polyisocyanate compounds may be those which have a structure of a polyester, polyether or polyurethane in the central part of the molecule, and isocyanate groups at two ends.

(II)-(v): Polyether (meth)acrylate, melamine (meth)acrylate, alkyd (meth)acrylate, isocyanurate (meth)acrylate and silion (meth)acrylate.

Reactive compounds of the following formulae are preferred as the reactive compound (II) having at least two (meth)acryloyl groups in the molecule in order to increase effectively the pressure-resistant strengtrh and impact strength of a glass container.

Compounds represented by the followign formula (a)

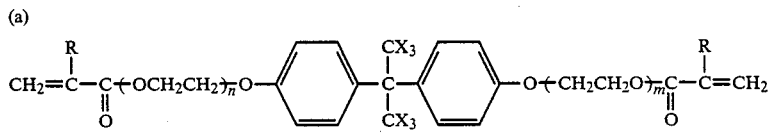

(wherein R represents H, F or $CH_3$, n and m are integers satisfying $2 \leq n+m \leq 10$ and may be identical or different, and X is H or F). Compounds represented by the following formula (b)

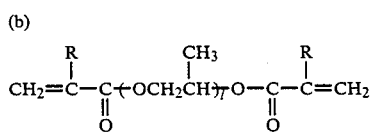

(wherein R and l are as defined above).

Compounds represented by the following formula

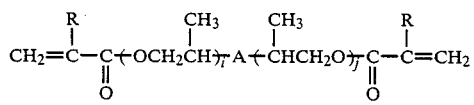

(wherein A is $-O(CH_2CH_2O)_k$, $-OCH_2CH_2CH_2CH_2O-$,

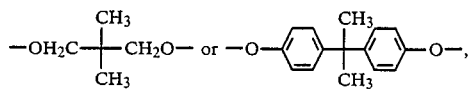

i, j and k are an integer of 1 to 10, and R is as defined above).

Compounds represented by the following formula

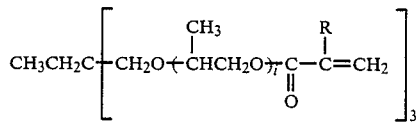

(wherein R and i are as defined above).

Compounds represennted by the following formula

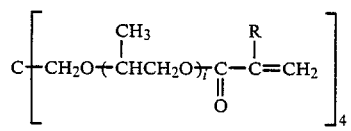

(wherein R and i are as defined above).

Compounds represented by the following formula (f)

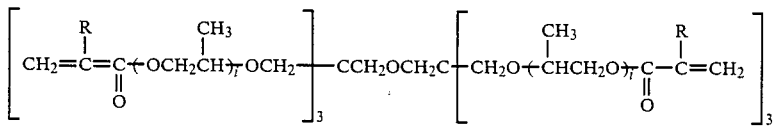

(wherein R and i are as defined above).

Compounds represented by the following formula (g)

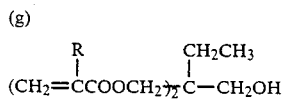

(wherein R is as defined above).

Compojnds represented by the following formula (h)

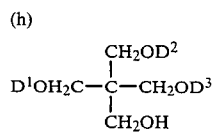

[wherein $D^1$ to $D^3$ represent a hydrogen atom or a (meth)acryloyl group, and at least two of $D^1$ to $D^3$ are (meth)acryloyl groups].

Compounds represented by the following formula (i)

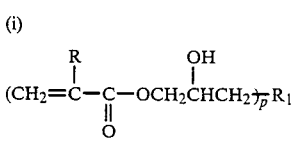

(wherein R is as defined, p is an integer of 2 to 5, and $R_1$ is a group selected from aliphatic and aromatic groups).

Compounds represented by the following formula (j)

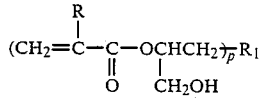

(wherein R, p and $R_1$ are as defined above).

The suitable proportion of the compound sof formulae (a) to (j) in the reactive compound having at least two (meth)acryloyl groups in the molecule used in accordace with this invention is usually 5 to 100%, especially 5 to 95%. In order to increase the adhesion of the cured resin to glass and obtain higher hot water resistance, it is preferably 5 to 50%.

More specific examples of the reactive compounds (II) are listed below.

| | |
|---|---|
| (II)-1: | ethylene glycol di(meth)acrylate |
| (II)-2: | diethylene glycol di(meth)acrylate |
| (II)-3: | triethylene glycol di(meth)acrylate |
| (II)-4: | polyethylene glycol di(meth)acrylate (number average molecular weight 150–1000) |
| (II)-5: | propylene glycol di(meth)acrylate |
| (II)-6: | dipropylene glycol di(meth)acrylate |
| (II)-7: | tripropylene glycol di(meth)acrylate |
| (II)-8: | polypropylene glycol di(meth)acrylate (number average molecular weight 250–1000) |
| (II)-9: | neopentyl glycol di(meth)acrylate |
| (II)-10: | 1,3-butanediol di(meth)acrylate |
| (II)-11: | 1,4-butanediol di(meth)acrylate |
| (II)-12: | 1,6-hexanediol di(meth)acrylate |

-continued (II)-13: hydroxypivalate neopentyl glycol di(meth)acrylate (II)-14: 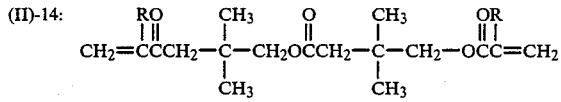

(R is H or CH₃)

(II)-15: 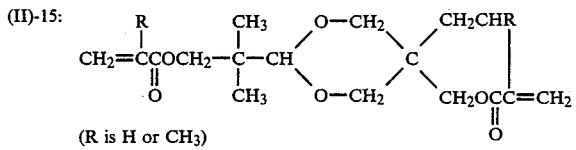

(R is H or CH₃)

(II)-16: bisphenol A di(meth)acrylate
(II)-17: trimethylolpropane tri(meth)acrylate
(II)-18: pentaerythritol tri(meth)acrylate
(II)-19: dipentaerythritol hexa(meth)acrylate
(II)-20: pentaerythritol tetra(meth)acrylate
(II)-21: trimethylolpropane di(meth)acrylate
(II)-22: dipentaerythritol monohydroxypenta-(meth)acrylate
(II)-23: polypropylene glycol-modified neopentyl glycol diacrylate
(II)-24: polyethylene glycol-modified bisphenol A diacrylate
(II)-25: polypropylene glycol-modified trimethylolpropane triacrylate
(II)-26: polyethylene glycol-modified trimethylolpropane triacrylate
(II)-27: dipentaerythritol hexaacrylate
(II)-28: tris(2-acryloxy) isocyanurate (II)-29: 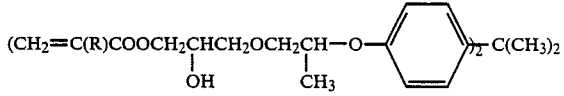

(II)-30: 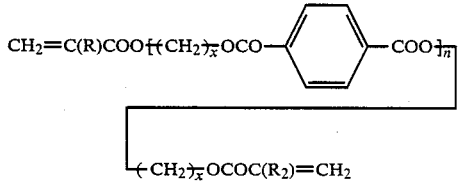

(n and x are an integer of 1 to 10)

(II)-31: 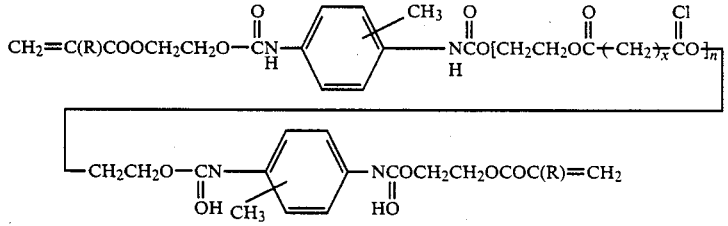

(II)-32: polyethylene glycol 400 di(meth)-acrylate
(II)-33: 1,3-bis(3'-acryloxyethoxy-2'-hydroxy-propyl) 5,5-dimethylhydantoin (II)-34: 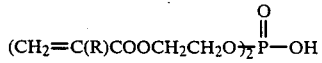

(II)-35: $(CH_2=C(R)COOCH_2CH_2O)_{\overline{2}} P=O$ (R is H or —CH₃)

-continued
(II)-36: 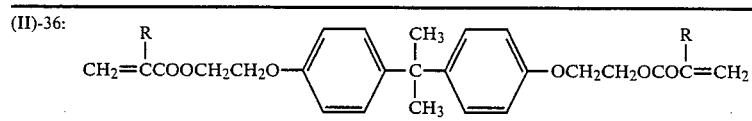
(II)-37: 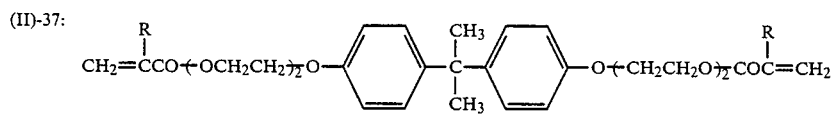
(II)-38: 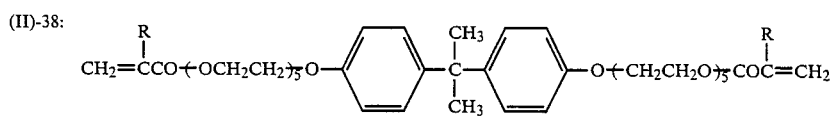
(II)-39: 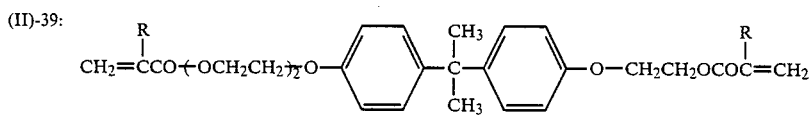
(II)-40: 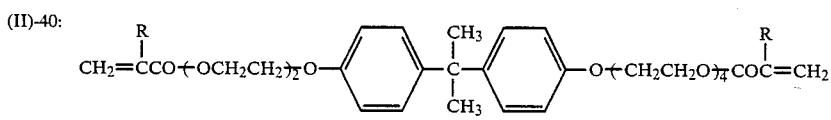
(II)-41: 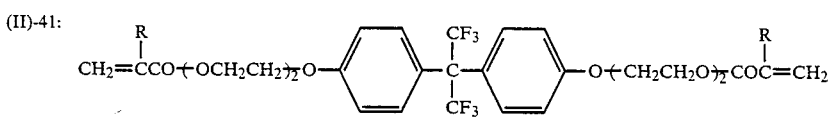
(II)-42: 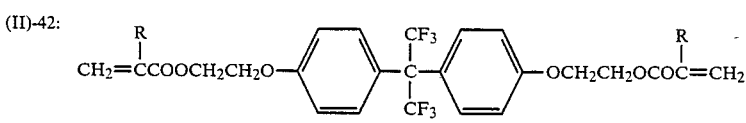
(II)-43: 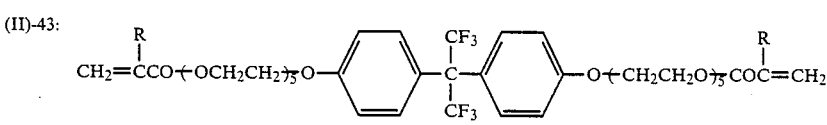
(II)-44: 
(II)-45: 
(II)-46: 
(II)-47: 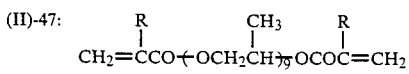
(II)-48: 
(II)-49: 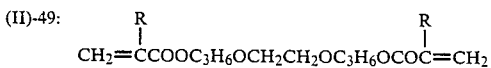
(II)-50: 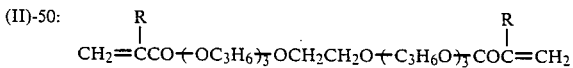
(II)-51: 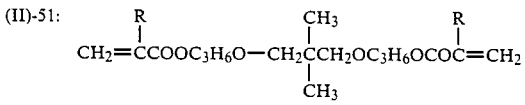

-continued
(II)-52: 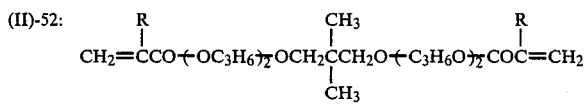
(II)-53: 
(II)-54: 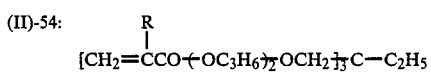
(II)-55: 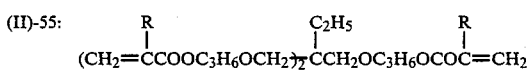
(II)-56: 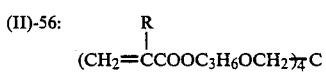
(II)-57: 
(II)-58: 
(II)-59: 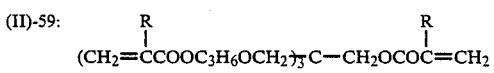
(II)-60: 
(II)-61: 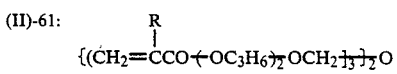
(II)-62: 
(II)-63: 
(II)-64: 
(II)-65: dipentaerythritol diacrylate
(II)-66: dipentaerythritol triacrylate
(II)-67: dipentaerythritol tetraacrylate
(II)-68: dipentaerythritol pentacrylate
(II)-69: 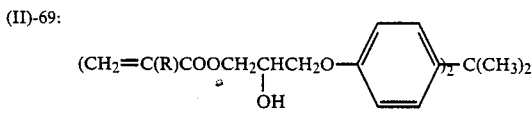
(II)-70: 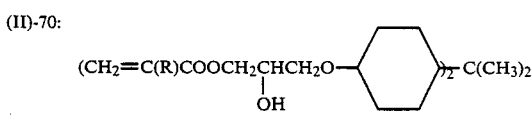
(II)-71: 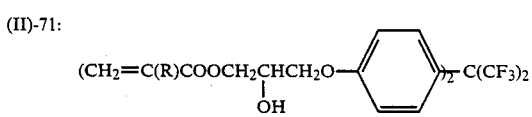

-continued
(II)-72: 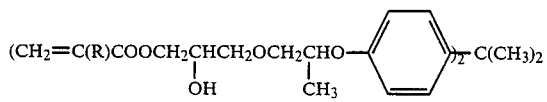
(II)-73: 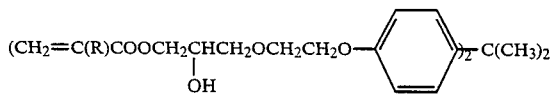
(II)-74: 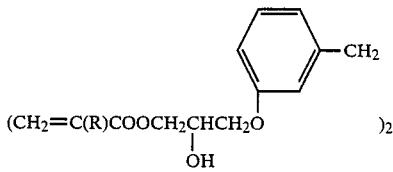
(II)-75: 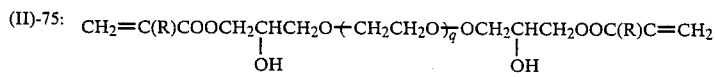
(q is an integer of 1 to 10)
(II)-76: 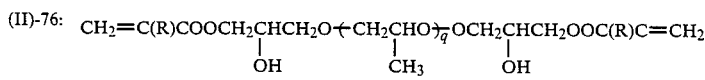
(q is an integer of 1 to 10)
(II)-77: 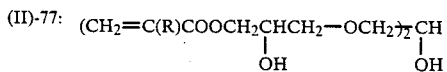
(II)-78: 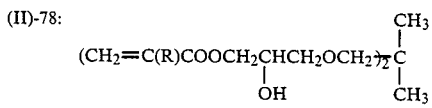
(II)-79: 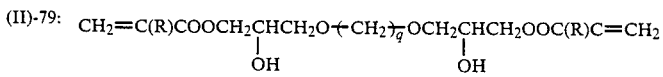
(q is an integer of 2 to 9)
(II)-80: 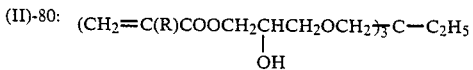
(II)-81: 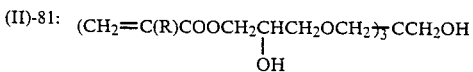
(II)-82: 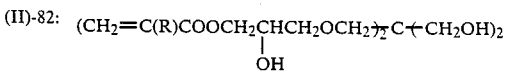
(II)-83: 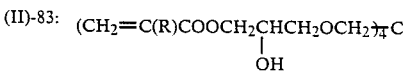
(II)-84: 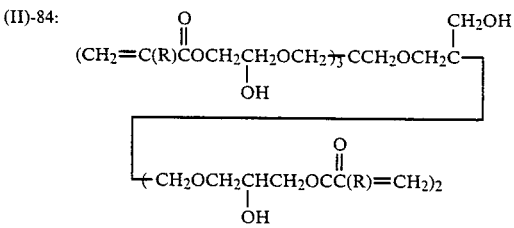
(II)-85: 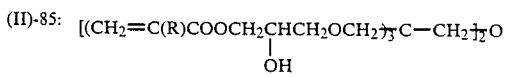

-continued (II)-86: 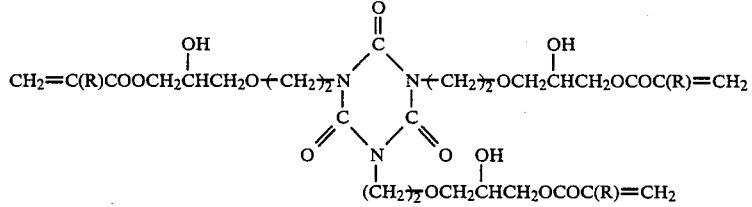

(II)-87:
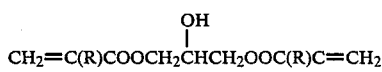

(R is H, F or CH₃)

The specific examples shown in (II)-69 to (II)-87 are all epoxy-modified (meth)acrylates of alphaadducts. It should be understood that beta-adducts are also included within the reactive compounds (II)–(iii) used in this invention, abnnd that these specific examples do not limit the reactive compounds (II)–(iii) that can be used in this invention.

The coating material used in this invention may also include a compound (III) generally called a diluting monomer in the art, which is a monofunctional monomer containing one (meth)acryloyl group in the molecule, in order to control the viscosity and reactivity of the resin compositin and the degree of curing after curing. Specific examples include the following.

| | |
|---|---|
| (III)-1: | (meth)acrylic acid |
| (III)-2: | alkyl ($C_1$–$C_{18}$) (meth)acrylates |
| (III)-3: | phenoxyethyl (meth)acrylate |
| (III)-4: | ethoxyethyl (meth)acrylate |
| (III)-5: | methoxyethyl (meth)acrylate |
| (III)-6: | butoxyethyl (meth)acrylate |
| (III)-7: | N,N—diethylaminoethyl (meth) acrylate |
| (III)-8: | N,N—dimethylaminoethyl (meth)acrylate |
| (III)-9: | glycidyl (meth)acrylate |
| (III)-10: | allyl (meth)acrylate |
| (III)-11: | 2-hydroxyethyl (meth)acrylate |
| (III)-12: | 2-hydroxypropyl (meth)acrylate |
| (III)-13: | 2-methoxyethoxyethyl (meth)acrylate |
| (III)-14: | 2-ethoxyethoxyethyl (meth)acrylate |
| (III)-15: | benzyl (meth)acrylate |
| (III)-16: | cyclohexyl (meth)acrylate |
| (III)-17: | dicyclopentenyl (meth)acrylate |
| (III)-18: | dicyclopentenyloxyethyl (meth)acrylate |
| (III)-19: | 2-hydroxyethyl (meth)acryloyl phosphate |
| (III)-20: | tetrahydrofurfuryl (meth)acrylate |
| (III)-21: | dicyclopentadienyl (meth)acrylate |
| (III)-22: | dicyclopentadieneethoxy (meth)-acrylate |
| (III)-23: | p-benzylphenoxyethyl (meth)acrylate |
| (III)-24: | 1,6-hexanediol mono(meth)acrylate |
| (III)-25: | neopentyl glycol mono(meth)acrylate |
| (III)-26: | glycerin mono(meth)acrylate |
| (III)-27: | trimethylolpropane mono(meth)-acrylate |
| (III)-28: | pentaerythritol mono(meth)acrylate |
| (III)-29: | 2-hydroxy-3-phenyloxypropyl (meth)-acrylate |
| (III)-30: | 2-hydroxy-3-octyloxypropyl (meth)-acrylate |
| (III)-31: | diethyleneglycol mono(meth)acrylate |
| (III)-32: | polyethylene glycol (400) mono-(meth)acrylate |
| (III)-33: | 2-(perfluorooctyl)ethyl (meth)-acrylate |
| (III)-34: | isobornyl (meth)acrylate |
| (III)-35: | dicyclopentyl (meth)acrylate |
| (III)-36: | phenyl (meth)acrylate |
| (III)-37: | 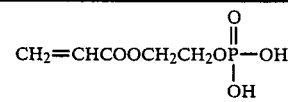 |

Preferably, a levelling agent or a surface-active agent is added to the coating material used in this invention in order to increase the uniformity of coating on the glass container. The levelling agent or the surface-active agent may be hydrocarbon compounds, silicone compounds and fluorine compounds. The use of oil-soluble fluorine-containing surface-active agents (IV) can effectively increase the pressure-resistant strength and impact strength of glass containers.

The oil-soluble fluorine-containing surface-active agents (IV) denote compounds which contain at least one $C_1$–$C_{20}$ fluorinated aliphatic group in the molecule and have a solubility in organic solvents at 25° C. of at least 0.1% by weight. The organic solvents referred to herein may be those used for controlling the viscosity and coatability of the coating material and the thickness of the coated film which will be described hereinafter.

The oil-soluble fluorine-containing surface-active agents (IV) may be of two typical types described below.

(1) Surface-active agents in which the fluorinated aliphatic group is linked to a polar group via a divalent linking group. Specific examples are given below.

(IV)-1: $C_8F_{17}SO_2N(C_3H_7)(CH_2CH_2O)_{11}H$ (IV)-2: $C_7F_{15}CON(CH_3)(CH_2CH_2O)_5H$ (IV)-3: $C_8F_{17}CH_2CH_2O(CHCHO)_{15}H$ (IV)-4: $C_8F_{17}CH_2CH_2SCH_2CH_2O(CH_2CH_2O)_{10}H$ (2) Surface-active agents in which the fluorinated aliphatic group is introduced as a side-chain of the polymer skeleton. Some of these fluorine polymers are commercially available, for example, under the tradenames MEGAFAC F-177, F-173, F-172, F-171 and F-184 (fluorine-containing surfactants) and DEFENSA MCF-300, MCF-321 and MCF-323 (surface-modifying agents) and DICGUARD F-320 andF-327 (solvent-type water repellents and oil repellents) all of which produced by Dainippon Ink and Chemicals, Inc. Fluroine-containing polymers having various molecular structures may be synthesized and used according to the properties required. For example, copolymers of fluorinated (meth)acrylate containing a $C_1$-$C_{20}$ fluorinated aliphatic group and the aforesaid monofunctional monomers having one (meth)acryloyl group in the molecule. More specific examples are given below.

(IV)-5: a copolymer having an average moleuclar weight of 30,000 derived from

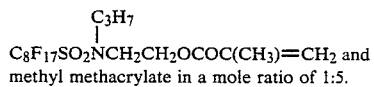

and methyl methacrylate in a mole ratio of 1:5.

(IV)-6: a copolymer having an average and methyl methacrylate in a mole ratio of 1:5.

(IV)-6: a copolymer having an average moleuclar weight of 40,000 derived from $C_nF_{2n+1}CH_2CH_2OCOCH=CH_2$ (a mixture of compounds with n being 1 to 16; average molecular weight 520) and methyl methacrylate macromer having an average molecular weight of about 5,000 in a mole ratio of 3:1). (IV)-7: polyurethane having an average molecular weight of 5,900 derived from $C_{10}F_{21}CH_2CH_2OH$, polypropylene glycol having a moleuclar weight of 5,000 and tolylene diisocyanate in a mole ratio of 2:1:2.

(IV)-8: Polyester having an average molecular weight of 4,700 derived from $C_8F_{17}SO_2N(CH_2CH_2OH)_2$, polyethylene glycol and adipic acid in a mole ratio of 1:3:4.

The coating material in accordance with this invention is coated on, or impregnated in, a glass article such as a glass container or another substrate, either as such or as pre-treated with the silane coupling agent, and then polymerized and cured by applying light, electron beams, radioactive energy, and heat to form the desired coated film. Where light such as ultraviolet light is used as the energy for initiation of polymerization, photopolymerization initiators known in the art can be used. Examples of the photopolymerization initiators (V) include

| | |
|---|---|
| (V)-1: | benzophenone |
| (V)-2: | acetophenone |
| (V)-3: | benzoin |
| (V)-4: | benzoin ethyl ether |
| (V)-5: | benzoin isobutyl ether |
| (V)-6: | benzylmethyl ketal |
| (V)-7: | azobisisobutyronitrile |
| (V)-8: | 1-hydroxycyclohexylphenylketone |
| (V)-9: | 2-hydroxy-2-methyl-1-phenylpropan-1-one. |

The polymerization may be expedited, as required, by adding a light sensitizer such as an amine compound or a phosphorus compound. The addition of the polymerization initiator is not particularly necessary when the polymerization and curing is carried out by electron beams or radioactive rays.

Where heat is used as the polymerization initator, the polymerization and curing may be carried out in the presence of a polymerization initiator such as azobisisobutyronitrile, benzoyl peroxide, and methyl ethyl ketone peroxide/cobalt naphthenate without using a catalyst.

Solvents may be incorporated to control the viscosity and coatability of the coating material and the silane coupling agent used in this invention and the thickness of the coated film. The solvents may be any solvents which do not adversely affect the polymerizability of the coating material and the treatment with the silane coupling agent, but low-boiling solvents are preferred in view of handlability. Examples include methanol, ethanol, isopropanol, butanol, acetone, methyl ethyl ketone, methyl isobutyl ketone, diethyl ether, tetrahydrofuran, methyl acetate, ethyl acetate, butyl acetate, n-hexane, toluene, chloroform, dichloroethane, carbon tetrachloride and 1-fluoro-1-dichloro-2-difluoro2-chloroethane.

The followikng examples illustrate the embodiments [I] and [II] of the method of this invention.

All parts in these examples are by weight.

EXAMPLES 1-31 AND COMPARATIVE EXAMPLES 1-4

A commercial hard glass plate (70×150×2 mm) was immersed for 1 hour in a 5% aqueous solution of sodium hydroxide, and washed with distilled water, and then dried in an oven at 60° C. for 5 minutes. The glass plate was then cut by a diamond cutter to form cuts, and in Examples according to the embodiment [1], the glass plate was treated with a silane coupling agent as described below. A coating material containing the active ingredients in a concentration adjusted to 40% with methyl ethyl ketone was coated on the glass plate by means of a No. 3 bar coater, and dried in an oven at 60° C. for 1 minute. The dried glass plate was subjected to ultraviolet irradiation for 30 seconds using one high-pressure mercury lamp (80 W/cm) to cure the coating. The cured film had a thickness of 3 micrometers.

The glass plate finally obtained was tested under the following conditions for 3-point flexural break strength and hot water resistance, and the results are summarized in Table 1.

Treatment with a silane coupling agent

Each of (a) a 0.5% water/isopropanol (½ by weight) solution of a silane coupling agent or (b) a 0.5% by weight water/isopropanol (½ by weight) solution of a silane coupling agent was adjusted to pH 4.5 with acetic acid, and then stirred at room temperature for 15 minutes. The glass plate having cuts formed therein was immersed in the solution and then dried at 60° C. for 2 minutes to treat the glass plate with the silane coupling agent. The thickness of the coating of the silane coupling agent was 3 mg/m². The marks (a) and (b) show the above silane coupling agent solutions.

Test for 3-point flexural break strength

Glass plate samples coated with the coating materials (n=20) were subjected to measurement of 3-point flexural break strength by using a flexural strength ester (Autograph AG-5000 C, made by Shimazu Seisakusho) with a span of 50 mm at a head speed of 0.5 mm/min. The measured values are shown in Table 1 as relative values to the 3-point flexural strength of a blank not coated with a silane coupling agent nor with the coating material.

Hot water resistance test

The glass plate coated with the coating material was immersed in hot water at 80° C., and the time required until the coated film was peeled by rubbing it with a cotton cloth (peeling time) was measured. Furthermore, the coated glass was immersed for 1 hour in hot water at 80° C., and then its 3-point flexural strength (n=20) was measured.

The designations in the table consisting of Roman and Arabic numerals correspond to the compounds given hereinabove. M after the designations represents a methacrylate compound, and A after them represents an acrylate compound.

TABLE 1

| Example (Ex.) or Comparative Example (CEx.) | Treatment with silane coupling agent | | Coating material | | Relative value of 3-point flexural break strength | Hot water resistance test | |
|---|---|---|---|---|---|---|---|
| | Structure of the coupling agent | Form of the coupling agent solution | Ingredient | Amount (parts) | | Peeling time (min.) | Relative value of 3-point flexural break strength |
| Ex. 1 | I-13 | (b) | II-16 (A) | 40 | 5.6 | 120 | 4.2 |
| | | | II-12 (A) | 10 | | | |
| | | | II-9 (A) | 10 | | | |
| | | | II-17 (A) | 15 | | | |
| | | | II-19 (A) | 15.9 | | | |
| | | | III-20 (A) | 5 | | | |
| | | | Acronal 4F(*) | 0.1 | | | |
| | | | V-8 | 4 | | | |
| Ex. 2 | I-13 | (a) | Same as in Example 1 | | 4.0 | 90 | 2.8 |
| Ex. 3 | I-13 | (b) | II-37 (A) | 40 | 6.0 | 200 | 5.3 |
| | | | II-12 (A) | 10 | | | |
| | | | II-9 (A) | 10 | | | |
| | | | II-17 (A) | 15 | | | |
| | | | II-19 (A) | 15.9 | | | |
| | | | III-20 (A) | 5 | | | |
| | | | ACRONAL 4F | 0.1 | | | |
| | | | V-8 | 4 | | | |
| Ex. 4 | I-13 | (b) | II-72 (A) | 40 | 6.0 | 200 | 5.2 |
| | | | II-12 (A) | 10 | | | |
| | | | II-9 (A) | 10 | | | |
| | | | II-17 (A) | 15 | | | |
| | | | II-19 (A) | 15.9 | | | |
| | | | III-20 (A) | 5 | | | |
| | | | ACRONAL 4F | 0.1 | | | |
| | | | V-8 | 4 | | | |
| Ex. 5 | I-13 | (b) | II-16 (A) | 40 | 6.1 | 220 | 5.4 |
| | | | II-46 (A) | 10 | | | |
| | | | II-9 (A) | 10 | | | |
| | | | II-17 (A) | 15 | | | |
| | | | II-19 (A) | 15.9 | | | |
| | | | III-20 (A) | 5 | | | |
| | | | ACRONAL 4F | 0.1 | | | |
| | | | V-8 | 4 | | | |
| Ex. 6 | I-13 | (b) | II-16 (A) | 40 | 5.8 | 210 | 5.1 |
| | | | II-12 (A) | 10 | | | |
| | | | II-82 (A) | 10 | | | |
| | | | II-17 (A) | 15 | | | |
| | | | II-19 (A) | 15.9 | | | |
| | | | III-20 (A) | 5 | | | |
| | | | ACRONAL 4F | 0.1 | | | |
| | | | V-8 | 4 | | | |
| Ex. 7 | I-13 | (b) | II-16 (A) | 40 | 6.0 | 200 | 5.4 |
| | | | II-12 (A) | 10 | | | |
| | | | II-9 (A) | 10 | | | |
| | | | II-17 (A) | 15 | | | |
| | | | II-68 (A) | 15.9 | | | |
| | | | III-20 (A) | 5 | | | |
| | | | ACRONAL 4F | 0.1 | | | |
| | | | V-8 | 4 | | | |
| Ex. 8 | I-13 | (b) | II-16 (A) | 40 | 6.1 | 190 | 5.3 |
| | | | II-12 (A) | 10 | | | |
| | | | II-9 (A) | 10 | | | |
| | | | II-17 (A) | 15 | | | |
| | | | II-64 (A) | 15.9 | | | |
| | | | III-20 (A) | 5 | | | |
| | | | ACRONAL 4F | 0.1 | | | |
| | | | V-8 | 4 | | | |
| Ex. 9 | I-13 | (b) | II-37 (A) | 40 | 6.5 | 230 | 5.9 |
| | | | II-46 (A) | 10 | | | |
| | | | II-9 (A) | 10 | | | |
| | | | II-17 (A) | 15 | | | |
| | | | II-19 (A) | 15.9 | | | |
| | | | III-20 (A) | 5 | | | |
| | | | ACRONAL 4F | 0.1 | | | |
| | | | V-8 | 4 | | | |
| | | | II-37 (A) | 40 | | | |
| | | | II-46 (A) | 10 | | | |
| | | | II-82 (A) | 10 | | | |
| | | | II-17 (A) | 15 | | | |

TABLE 1-continued

| Example (Ex.) or Comparative Example (CEx.) | Treatment with silane coupling agent | | Coating material | | Relative value of 3-point flexural break strength | Hot water resistance test | |
|---|---|---|---|---|---|---|---|
| | Structure of the coupling agent | Form of the coupling agent solution | Ingredient | Amount (parts) | | Peeling time (min.) | Relative value of 3-point flexural break strength |
| Ex. 10 | I-13 | (b) | II-68 (A) | 15.9 | 7.0 | >240 | 6.7 |
| | | | III-20 (A) | 5 | | | |
| | | | ACRONAL 4F | 0.1 | | | |
| | | | V-8 | 4 | | | |
| | | | II-42 (A) | 40 | | | |
| | | | II-46 (A) | 10 | | | |
| | | | II-75 (A) | 10 | | | |
| | | | II-17 (A) | 15 | | | |
| Ex. 11 | I-13 | (b) | II-64 (A) | 15.9 | 6.6 | >240 | 6.4 |
| | | | III-12 (A) | 5 | | | |
| | | | MEGAFAC F-177(**) | 0.1 | | | |
| | | | V-8 | 4 | | | |
| Ex. 12 | I-13 | (a) | Same as in Example 10 | | 6.1 | 240 | 6.0 |
| Ex. 13 | I-13 | (b) | Same as in Example 10 except that compound II-37(A) in which R is F is used instead of the compound II-37(A). | | 7.0 | >240 | 6.7 |
| Ex. 14 | I-13 | (b) | Same as in Example 10 except that II-37(M) was used instead of II-37(A) | | 7.2 | >240 | 6.8 |
| | | | II-38 (A) | 40 | | | |
| | | | II-2 (A) | 20 | | | |
| | | | II-17 (M) | 15 | | | |
| Ex. 15 | I-15 | (a) | II-19 (A) | 10.9 | 5.6 | 180 | 4.7 |
| | | | III-34 (A) | 9 | | | |
| | | | V-7 | 4 | | | |
| Ex. 16 | I-15 | (b) | Same as in Example 15 | | 5.9 | 210 | 5.2 |
| | | | II-39 (M) | 30 | | | |
| | | | II-2 (A) | 30 | | | |
| | | | II-19 (A) | 10.9 | | | |
| Ex. 17 | I-2 | (a) | III-35 (A) | 2 | 5.5 | 150 | 4.1 |
| | | | V-3 | 4 | | | |
| | | | II-51 (A) | 30 | | | |
| | | | II-12 (A) | 20 | | | |
| Ex. 18 | I-10 | (b) | II-17 (A) | 25 | 6.3 | 190 | 5.8 |
| | | | II-16 (A) | 10.9 | | | |
| | | | III-18 (M) | 5 | | | |
| | | | MEGAFAC F-177 | 0.1 | | | |
| | | | V-9 | 4 | | | |
| | | | II-61 (A) | 40 | | | |
| | | | II-9 (A) | 20 | | | |
| Ex. 19 | I-22 | (a) | II-19 (A) | 34.9 | 5.3 | 170 | 5.1 |
| | | | ACRONAL 4F | 0.1 | | | |
| | | | V-4 | 4 | | | |
| | | | II-53 (A) | 40 | | | |
| Ex. 20 | I-1 | (b) | II-9 (M) | 20 | 6.0 | 240 | 5.6 |
| | | | II-19 (A) | 30.9 | | | |
| | | | V-8 | 4 | | | |
| | | | II-9 (A) | 90.9 | | | |
| Ex. 21 | I-13 | (a) | ACRONAL 4F | 0.1 | 4.8 | 100 | 4.8 |
| | | | V-8 | 4 | | | |
| | | | II-19 (A) | 90.9 | | | |
| Ex. 22 | I-14 | (b) | V-8 | 4 | 4.9 | 100 | 4.3 |
| | | | ACRONAL 4F | 0.1 | | | |
| Ex. 23 | I-13 | (a) | III-37 (A) | 90.9 | 5.7 | 190 | 5.1 |
| | | | ACRONAL 4F | 5 | | | |
| | | | V-8 | 4 | | | |
| | | | II-44 (A) | 90.9 | | | |
| Ex. 24 | I-13 | (b) | ACRONAL 4F | 0.1 | 5.7 | 130 | 5.6 |
| | | | V-8 | 4 | | | |
| | | | II-60 (A) | 90.9 | | | |
| Ex. 25 | I-14 | (a) | V-8 | 4.1 | 5.5 | 140 | 5.1 |
| | | | II-77 (A) | 90.9 | | | |
| Ex. 26 | I-13 | (b) | ACRONAL 4F | 0.1 | 5.9 | 180 | 5.3 |
| | | | V-8 | 4 | | | |
| | | | II-9 (A) | 60 | | | |
| Ex. 27 | I-13 | (a) | III-20 (A) | 30.9 | 4.9 | 110 | 4.5 |
| | | | ACRONAL 4F | 0.1 | | | |
| | | | V-8 | 4 | | | |
| | | | II-37 (A) | 80 | | | |
| Ex. 28 | I-13 | (b) | III-20 (A) | 10.9 | 6.0 | 200 | 5.4 |
| | | | ACRONAL 4F | 0.1 | | | |
| | | | V-8 | 4 | | | |

TABLE 1-continued

| Example (Ex.) or Comparative Example (CEx.) | Treatment with silane coupling agent | | Coating material | | Relative value of 3-point flexural break strength | Peeling time (min.) | Hot water resistance test Relative value of 3-point flexural break strength |
|---|---|---|---|---|---|---|---|
| | Structure of the coupling agent | Form of the coupling agent solution | Ingredient | Amount (parts) | | | |
| Ex. 29 | I-13 | (a) | II-68 (A) | 20 | 5.2 | 120 | 4.4 |
| | | | III-35 (A) | 70.9 | | | |
| | | | ACRONAL 4F | 0.1 | | | |
| | | | V-8 | 4 | | | |
| Ex. 30 | I-13 | (a) | II-68 (A) | 5 | 4.6 | 100 | 4.2 |
| | | | III-35 (A) | 85.9 | | | |
| | | | ACRONAL 4F | 0.1 | | | |
| | | | III-20 (A) | 4 | | | |
| | | | V-8 | 4 | | | |
| Ex. 31 | I-13 | (b) | II-37 (A) | 40 | 7.7 | >240 | 7.7 |
| | | | II-46 (A) | 10 | | | |
| | | | II-64 (A) | 15 | | | |
| | | | II-77 (A) | 10 | | | |
| | | | II-17 (A) | 15 | | | |
| | | | III-20 (A) | 10 | | | |
| | | | ACRONAL 4F | 0.1 | | | |
| | | | V-8 | 4 | | | |
| CEx. 1 | Not done | | Same as in Example 1 | | 1.7 | 10 | 1.1 |
| CEx. 2 | Not done | | Same as in Example 10 | | 1.9 | 15 | 1.1 |
| CEx. 3 | I-13 | (b) | Not applied | | 1.0 | — | 1.0 |
| CEx. 4 | I-13 | (b) | III-20 (A) | 90.9 | 1.8 | 20 | 1.1 |
| | | | ACRONAL 4F | 0.1 | | | |
| | | | V-8 | 4 | | | |

(*) a hydrocarbon-type surface active agent produced by BASF
(**): Fluorine-type levelling agent produced by Dainippon Ink and Chemicals, Inc.

EXAMPLE 32

Scratches were provided on the outside surface of a glass bottle (weight 170 g, capacity 300 ml) produced by Yamamura Glass Co., Ltd., and then the glass bottle was treated with a silane coupling agent. The bottle was then coated with the coating material in each of Examples 1 to 31 as a 40% by weight methyl ethyl ketone solution by a dipping method. Immediately then, the coated bottle was dried in an oven at 60° C. for 1 minute and passed through an unltraviolet curing oven (two high-pressure mercury lamps 160 W/cm) to form a cured film having a thickness of 3 micrometers on its outside surface. The coated glass bottle was tested for pressure-resistant strength (Method of Testing the Internal Pressure Resistance of Glass Bottles for Holding Carbonated Drinks in accordance with JIS S-2302; where a bottle did not burst under a water injecting pressure of 700 pounds, its pressure-resistant strength was taken as 700 pounds), and impact strength (Method of Testing Mechanical Impact of Glass Bottles for Holding Carbonated Drinks in accordance with JIS S-2303).

The results are shown in Table 2 as percent increases of an average value and a minimum value of these strengths with respect to the average value and the minimum value of a control (glass bottle not coated with the coating material). Table 3 shows the pressure-resistant strength and impact strength of the control bottle.

The same teste were conducted using the coating materials used in Comparative Example 1 to 4. The results are also shown in Table 2.

Scratching conditions were as follows:

(1) Scratching at the inside surface

Carborundum #24 (11 g) was put in a glass bottle, and the bottle was rotated for 30 seconds while it was maintained horizontal. Thus, the inside surface was uniformly scratched.

(2) Scratching at the outside surface

A glass bottle was scratched for 5 minutes by a line simulator made by AGR to scratch the outside surface of the bottle uniformly.

The results given in Table 2 show that the coating material in accordance with this invention markedly increases the pressure-resistant strength and impact strength of glass bottles. In particular, the increase of the pressure-resistant strength is a marked effect not obtained heretofore.

TABLE 2

| | | Percent increase in pressure-resistant strength and impact strength (%) n = 24 | | | | | | | | | | | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 |
| | Non-scratched | | | | | | | | | | | | | | | | | | |
| Pressure resistant strength | (average) | 39 | 28 | 42 | 43 | 43 | 41 | 42 | 43 | 46 | 49 | 48 | 43 | 50 | 51 | 22 | 24 | 39 | 44 |
| | (minimum) | 74 | 53 | 79 | 80 | 80 | 77 | 80 | 78 | 86 | 92 | 78 | 80 | 93 | 96 | 74 | 78 | 73 | 83 |
| | Scratched at the outside surface | | | | | | | | | | | | | | | | | | |
| | (average) | 52 | 37 | 55 | 56 | 56 | 53 | 55 | 56 | 60 | 65 | 63 | 56 | 65 | 67 | 52 | 54 | 51 | 58 |
| | (minimum) | 78 | 56 | 84 | 83 | 82 | 81 | 80 | 82 | 86 | 98 | 88 | 85 | 98 | 100 | 78 | 83 | 77 | 88 |
| | Non-scratched | | | | | | | | | | | | | | | | | | |
| Impact strength | (average) | 22 | 16 | 24 | 23 | 22 | 20 | 21 | 24 | 25 | 28 | 26 | 24 | 29 | 30 | 22 | 24 | 22 | 25 |
| | (minimum) | 62 | 44 | 66 | 67 | 67 | 66 | 65 | 68 | 69 | 77 | 73 | 67 | 78 | 80 | 62 | 65 | 61 | 69 |

TABLE 2-continued

|  | Scratched at the outside surface | | | | | | | | | | | | | | | | | | |
|---|---|---|---|---|---|---|---|---|---|---|---|---|---|---|---|---|---|---|---|
|  | (average) | 19 | 14 | 20 | 21 | 21 | 20 | 22 | 23 | 24 | 25 | 24 | 21 | 25 | 26 | 19 | 20 | 19 | 21 |
|  | (minimum) | 81 | 50 | 76 | 77 | 77 | 75 | 77 | 79 | 82 | 89 | 83 | 77 | 88 | 91 | 71 | 74 | 69 | 79 |

Percent increase in pressure-resistant strength and impact strength (%) n = 24

| | | Example | | | | | | | | | | | | Comparative Example | | | |
|---|---|---|---|---|---|---|---|---|---|---|---|---|---|---|---|---|---|
| | | 19 | 20 | 21 | 22 | 23 | 24 | 25 | 26 | 27 | 28 | 29 | 30 | 31 | 1 | 2 | 3 | 4 |
| Pressure-resistant strength | Non-scratched (average) | 37 | 42 | 33 | 34 | 40 | 42 | 40 | 41 | 36 | 43 | 36 | 33 | 55 | 8 | 8 | 0 | 13 |
| | (minimum) | 70 | 80 | 63 | 64 | 75 | 77 | 74 | 78 | 67 | 80 | 68 | 62 | 103 | 1 | 0 | 0 | 23 |
| | Scratched at the outside surface (average) | 49 | 54 | 44 | 44 | 50 | 47 | 47 | 55 | 45 | 55 | 48 | 44 | 71 | 8 | 10 | 0 | 16 |
| | (minimum) | 74 | 84 | 67 | 68 | 80 | 83 | 80 | 83 | 69 | 84 | 73 | 66 | 109 | 1 | 1 | 5 | 25 |
| Impact strength | Non-scratched (average) | 21 | 24 | 18 | 20 | 23 | 23 | 20 | 24 | 20 | 24 | 22 | 20 | 31 | 6 | 7 | 0 | 8 |
| | (minimum) | 58 | 66 | 53 | 55 | 63 | 62 | 62 | 65 | 54 | 66 | 57 | 52 | 85 | 0 | 0 | 0 | 20 |
| | Scratched at the outside surface (average) | 18 | 21 | 16 | 18 | 20 | 21 | 20 | 21 | 17 | 21 | 18 | 17 | 27 | 5 | 10 | 0 | 11 |
| | (minimum) | 66 | 76 | 60 | 62 | 72 | 74 | 70 | 74 | 62 | 77 | 65 | 59 | 99 | 0 | 0 | 5 | 23 |

TABLE 3

| | | n = 24 | |
|---|---|---|---|
| | | Average | Minimum |
| Pressure-resistant strength (Psi) | Non-Scratched | 511 | 300 |
| | Scratched at the outside surface | 307 | 200 |
| Impact strength (kg-cm) | Non-scratched | 8.4 | 2.0 |
| | Scratched at the outside surface | 4.4 | 2.0 |

EXAMPLES 33-71 AND COMPARATIVE EXAMPLES 5-12

As in Examples 1 to 31, a glass plate having cuts formed on it was coated with each of the coating materials shown in Table 4 adjusted to a concentration of 40% by weight with methyl ethyl ketone by a No. 3 bar coater, and the coating was cured as in Example 1 to 31 to give 3.0 micrometers thick cured coating.

The coated glass bottle (n=20) wsa tested for the 3-point flexural break strength, and the peeling time and the 3-poiht flexural break strength in a hot water resistance test. The results are shown in Table 4.

TABLE 4

| Example (Ex.) or Comparative Example (CEx.) | Coating material | | Acid value | Relative value of 3-point flexural break strength | Hot water resistance test | |
|---|---|---|---|---|---|---|
| | | | | | Peeling time (min.) | Relative value of 3-point flexural break strength |
| | Ingredient | Amount (parts) | | | | |
| Ex. 33 | II-69 (A) | 60 | 0 | 4.7 | — | — |
| | II-17 (A) | 20 | | | | |
| | I-13 | 7 | | | | |
| | III-20 (A) | 20 | | | | |
| | IV-6 | 1 | | | | |
| | V-8 | 4 | | | | |
| Ex. 34 | II-80 (A) | 60 | 0 | 5.0 | — | — |
| | II-17 (A) | 20 | | | | |
| | I-13 | 7 | | | | |
| | III-20 (A) | 20 | | | | |
| | IV-6 | 1 | | | | |
| | V-8 | 4 | | | | |
| Ex. 35 | II-82 (A) | 60 | 0 | 4.8 | — | — |
| | II-17 (A) | 40.8 | | | | |
| | I-13 | 0.15 | | | | |
| | III-20 (A) | 6.05 | | | | |
| | IV-6 | 1 | | | | |
| | V-8 | 4 | | | | |
| Ex. 36 | II-77 (A) | 60 | 0 | 4.9 | — | — |
| | II-17 (A) | 20 | | | | |
| | I-13 | 7 | | | | |
| | III-20 (A) | 20 | | | | |
| | IV-6 | 1 | | | | |
| | V-8 | 4 | | | | |
| | I-9 (A) | 6 | | | | |
| | I-17 (A) | 6 | | | | |
| | I-13 | 20 | | | | |
| Ex. 37 | III-20 (A) | 75 | 0 | 3.5 | — | — |

TABLE 4-continued

| Example (Ex.) or Comparative Example (CEx.) | Coating material Ingredient | Amount (parts) | Acid value | Relative value of 3-point flexural break strength | Hot water resistance test Peeling time (min.) | Hot water resistance test Relative value of 3-point flexural break strength |
|---|---|---|---|---|---|---|
| | IV-6 | 1 | | | | |
| | V-9 | 4 | | | | |
| | II-19 (A) | 60 | | | | |
| | II-17 (A) | 20 | | | | |
| | I-13 | 7 | | | | |
| Ex. 38 | III-20 (A) | 20 | 0 | 4.0 | — | — |
| | IV-6 | 1 | | | | |
| | V-9 | 4 | | | | |
| | II-31(M) n=3, x=4 | 60 | | | | |
| | II-19 (A) | 30 | | | | |
| | I-13 | 5 | | | | |
| Ex. 39 | III-11 (A) | 12 | 0 | 3.4 | — | — |
| | MEGAFAC F-177 | 2 | | | | |
| | V-8 | 3 | | | | |
| | Urethane diacrylate (MW=12,000)derived from ethylene glycol adipate, polyester/tolylene diisocyanate/2-hydroxyethyl | 6.0 | | | | |
| Ex. 40 | acrylate | | 0 | 2.4 | — | — |
| | II-17 (A) | 20 | | | | |
| | I-13 | 7 | | | | |
| | III-20 (A) | 20 | | | | |
| | IV-6 | 1 | | | | |
| | V-8 | 4 | | | | |
| Ex. 41 | Same as in Example 33 except that IV-6 was omitted | | 0 | 4.1 | — | — |
| Ex. 42 | II-37 (A) | 40 | 0 | 5.5 | — | — |
| | II-46 (A) | 10 | | | | |
| | II-82 (A) | 10 | | | | |
| | II-17 (A) | 15 | | | | |
| | II-68 (A) | 10.9 | | | | |
| | III-20 (A) | 5 | | | | |
| | I-13 | 5 | | | | |
| | ACRONAL 4F | 0.1 | | | | |
| | V-8 | 4 | | | | |
| | II-16 (A) | 40 | | | | |
| | II-12 (A) | 10 | | | | |
| | II-9 (A) | 10 | | | | |
| | II-17 (A) | 15 | | | | |
| Ex. 43 | II-19 (A) | 10.9 | 0.16 | 5.7 | 130 | 5.3 |
| | III-20 (A) | 5 | | | | |
| | I-13 | 5 | | | | |
| | ACRONAL 4F | 0.1 | | | | |
| | V-8 | 4 | | | | |
| | p-toluenesulfonic acid.H$_2$O | 0.055 | | | | |
| | II-37 (A) | 40 | | | | |
| | II-12 (A) | 10 | | | | |
| | II-9 (A) | 10 | | | | |
| | II-17 (A) | 15 | | | | |
| Ex. 44 | II-19 (A) | 10.9 | 0.16 | 5.7 | 200 | 4.2 |
| | III-20 (A) | 5 | | | | |
| | I-13 | 5 | | | | |
| | ACRONAL 4F | 0.1 | | | | |
| | V-8 | 4 | | | | |
| | p-toluenesulfonic acid.H$_2$O | 0.055 | | | | |
| | II-72 (A) | 40 | | | | |
| | II-12 (A) | 10 | | | | |
| | II-9 (A) | 10 | | | | |
| | II-17 (A) | 15 | | | | |
| Ex. 45 | II-19 (A) | 10.9 | 0.16 | 5.8 | 200 | 5.2 |
| | III-20 (A) | 5 | | | | |
| | I-13 | 5 | | | | |
| | ACRONAL 4F | 0.1 | | | | |
| | V-8 | 4 | | | | |
| | p-toluenesulfonic acid.H$_2$O | 0.055 | | | | |
| | II-16 (A) | 40 | | | | |
| | II-46 (A) | 10 | | | | |
| | II-9 (A) | 10 | | | | |
| | II-17 (A) | 15 | | | | |
| Ex. 46 | II-19 (A) | 10.9 | 0.16 | 6.0 | 200 | 5.2 |
| | III-20 (A) | 5 | | | | |
| | I-13 | 5 | | | | |

TABLE 4-continued

| Example (Ex.) or Comparative Example (CEx.) | Coating material Ingredient | Amount (parts) | Acid value | Relative value of 3-point flexural break strength | Hot water resistance test Peeling time (min.) | Relative value of 3-point flexural break strength |
|---|---|---|---|---|---|---|
| | ACRONAL 4F | 0.1 | | | | |
| | V-8 | 4 | | | | |
| | p-toluenesulfonic acid.H$_2$O | 0.055 | | | | |
| | II-16 (A) | 40 | | | | |
| | II-12 (A) | 10 | | | | |
| | II-82 (A) | 10 | | | | |
| | II-17 (A) | 15 | | | | |
| Ex. 47 | II-19 (A) | 10.9 | 0.16 | 5.9 | 210 | 5.2 |
| | III-20 (A) | 5 | | | | |
| | I-13 | 5 | | | | |
| | ACRONAL 4F | 0.1 | | | | |
| | V-8 | 4 | | | | |
| | p-toluenesulfonic acid.H$_2$O | 0.055 | | | | |
| | II-16 (A) | 40 | | | | |
| | II-12 (A) | 10 | | | | |
| | II-9 (A) | 10 | | | | |
| | II-17 (A) | 15 | | | | |
| Ex. 48 | II-68 (A) | 10.9 | 0.16 | 6.0 | 200 | 5.5 |
| | III-20 (A) | 5 | | | | |
| | I-13 | 5 | | | | |
| | ACRONAL 4F | 0.1 | | | | |
| | V-8 | 4 | | | | |
| | p-toluenesulfonic acid.H$_2$O | 0.055 | | | | |
| | II-16 (A) | 40 | | | | |
| | II-12 (A) | 10 | | | | |
| | II-9 (A) | 10 | | | | |
| | II-17 (A) | 15 | | | | |
| Ex. 49 | II-64 (A) | 10.9 | 0.16 | 6.2 | 180 | 6.0 |
| | III-20 (A) | 5 | | | | |
| | I-13 | 5 | | | | |
| | ACRONAL 4F | 0.1 | | | | |
| | V-8 | 4 | | | | |
| | p-toluenesulfonic acid.H$_2$O | 0.055 | | | | |
| | II-37 (A) | 40 | | | | |
| | II-46 (A) | 10 | | | | |
| | II-9 (A) | 10 | | | | |
| | II-17 (A) | 15 | | | | |
| Ex. 50 | II-19 (A) | 10.9 | 0.16 | 6.6 | 200 | 5.8 |
| | III-20 (A) | 5 | | | | |
| | I-13 | 5 | | | | |
| | ACRONAL 4F | 0.1 | | | | |
| | V-8 | 4 | | | | |
| | p-toluenesulfonic acid.H$_2$O | 0.055 | | | | |
| | II-37 (A) | 40 | | | | |
| | II-46 (A) | 10 | | | | |
| | II-82 (A) | 10 | | | | |
| | II-17 (A) | 15 | | | | |
| Ex. 51 | II-68 (A) | 10.9 | 0.16 | 7.0 | >240 | 6.6 |
| | III-20 (A) | 5 | | | | |
| | I-13 | 5 | | | | |
| | ACRONAL 4F | 0.1 | | | | |
| | V-8 | 4 | | | | |
| | p-toluenesulfonic acid.H$_2$O | 0.055 | | | | |
| | II-42 (A) | 40 | | | | |
| | II-46 (A) | 10 | | | | |
| | II-75 (A) (q=3) | 10 | | | | |
| Ex. 52 | II-17 (A) | 15 | 0.16 | 6.8 | >240 | 6.4 |
| | II-64 (A) | 10.9 | | | | |
| | III-12 (A) | 5 | | | | |
| | I-13 | 5 | | | | |
| | MEGAFAC F-177 | 0.1 | | | | |
| | V-8 | 4 | | | | |
| | p-toluenesulfonic acid.H$_2$O | 0.055 | | | | |
| Ex. 53 | Same as in Example 51 except that compound II-37 in which R is F was used instead of II-37(A) | | 0.16 | 6.4 | >240 | 6.3 |
| Ex. 54 | Same as in Example 51 except that II-82(M) was used instead of II-82(A) | | 0.16 | 6.9 | >240 | 6.8 |
| Ex. 55 | Same as in Example 51 except that acrylic acid was used instead of III-20(A) and p-toluenesulfonic acid was omitted. | | 39 | 6.7 | 220 | 6.2 |
| Ex. 56 | II-38 (A) | 40 | 0.32 | 5.7 | 220 | 4.8 |

TABLE 4-continued

| Example (Ex.) or Comparative Example (CEx.) | Coating material Ingredient | Amount (parts) | Acid value | Relative value of 3-point flexural break strength | Peeling time (min.) | Relative value of 3-point flexural break strength |
|---|---|---|---|---|---|---|
| | II-2 (A) | 20 | | | | |
| | II-17 (M) | 15 | | | | |
| | II-19 (A) | 10.9 | | | | |
| | III-34 (A) | 9 | | | | |
| | I-15 | 0.1 | | | | |
| | V-7 | 4 | | | | |
| | p-toluenesulfonic acid.H₂O | 0.11 | | | | |
| | II-39 (M) | 30 | | | | |
| | II-2 (A) | 30 | | | | |
| | II-19 (A) | 10.9 | | | | |
| Ex. 57 | III-35 (A) | 2 | 1.6 | 5.6 | 160 | 4.8 |
| | I-2 | 8 | | | | |
| | V-3 | 4 | | | | |
| | Acetic acid | 0.19 | | | | |
| | II-51 (A) | 30 | | | | |
| | II-12 (A) | 20 | | | | |
| | II-17 (A) | 25 | | | | |
| Ex. 58 | II-16 (A) | 10.9 | | | | |
| | III-18 (M) | 5 | 85 | 6.2 | 180 | 5.9 |
| | MEGAFAC F-177 | 0.1 | | | | |
| | I-10 | 6 | | | | |
| | III-1 (A) | 10.9 | | | | |
| | V-9 | 4 | | | | |
| | II-61 (A) | 40 | | | | |
| | II-9 (A) | 20 | | | | |
| | II-19 (A) | 34.9 | | | | |
| Ex. 59 | I-22 | 1 | 0.16 | 5.4 | 220 | 5.0 |
| | ACRONAL 4F | 0.1 | | | | |
| | V-4 | 4 | | | | |
| | p-toluenesulfonic acid.H₂O | 0.055 | | | | |
| | II-53 (A) | 40 | | | | |
| | II-9 (M) | 20 | | | | |
| | II-19 (A) | 30.9 | | | | |
| Ex. 60 | I-1 | 5 | 0.16 | 6.1 | 240 | 5.8 |
| | p-toluenesulfonic acid.H₂O | 0.055 | | | | |
| | V-8 | 4 | | | | |
| | II-9 (A) | 90.9 | | | | |
| Ex. 61 | I-13 | 5 | | | | |
| | ACRONAL 4F | 0.1 | 0.16 | 4.8 | 140 | 3.8 |
| | V-8 | 4 | | | | |
| | p-toluenesulfonic acid.H₂O | 0.055 | | | | |
| | II-19 (A) | 90.9 | | | | |
| Ex. 62 | I-14 | 5 | | | | |
| | ACRONAL 4F | 0.1 | 0.16 | 4.7 | 160 | 4.5 |
| | V-8 | 4 | | | | |
| | p-toluenesulfonic acid.H₂O | 0.055 | | | | |
| | II-37 (A) | 90.9 | | | | |
| Ex. 63 | I-13 | 5 | | | | |
| | ACRONAL 4F | 0.1 | 0.16 | 5.7 | 200 | 5.3 |
| | V-8 | 4 | | | | |
| | p-toluenesulfonic acid.H₂O | 0.055 | | | | |
| | II-44 (A) | 90.9 | | | | |
| Ex. 64 | I-13 | 5 | | | | |
| | ACRONAL 4F | 0.1 | 0.016 | 5.7 | 180 | 5.5 |
| | V-8 | 4 | | | | |
| | p-toluenesulfonic acid.H₂O | 0.0055 | | | | |
| | II-60 (A) | 90.9 | | | | |
| Ex. 65 | I-14 | 5 | | | | |
| | V-8 | 4.1 | 0.16 | 5.6 | 190 | 5.1 |
| | p-toluenesulfonic acid.H₂O | 0.055 | | | | |
| | II-77 (A) | 90.9 | | | | |
| Ex. 66 | I-13 | 5 | | | | |
| | ACRONAL 4F | 0.1 | 0.16 | 5.9 | 190 | 5.2 |
| | V-8 | 4 | | | | |
| | p-toluenesulfonic acid.H₂O | 0.055 | | | | |
| | II-9 (A) | 60 | | | | |
| | III-20 (A) | 30.9 | | | | |
| Ex. 67 | I-13 | 5 | | | | |
| | ACRONAL 4F | 0.1 | 0.16 | 5.2 | 140 | 4.0 |
| | V-8 | 4 | | | | |
| | p-toluenesulfonic acid.H₂O | 0.055 | | | | |
| | II-37 (A) | 80 | | | | |
| | III-20 (A) | 10.9 | | | | |

TABLE 4-continued

| Example (Ex.) or Comparative Example (CEx.) | Coating material Ingredient | Amount (parts) | Acid value | Relative value of 3-point flexural break strength | Hot water resistance test Peeling time (min.) | Relative value of 3-point flexural break strength |
|---|---|---|---|---|---|---|
| Ex. 68 | I-13 | 5 | 0.16 | 6.0 | 200 | 5.8 |
| | ACRONAL 4F | 0.1 | | | | |
| | V-8 | 4 | | | | |
| | p-toluenesulfonic acid.H₂O | 0.055 | | | | |
| | II-68 (A) | 20 | | | | |
| | III-35 (A) | 70.9 | | | | |
| Ex. 69 | I-13 | 5 | 0.16 | 5.6 | 200 | 5.3 |
| | ACRONAL 4F | 0.1 | | | | |
| | V-8 | 4 | | | | |
| | p-toluenesulfonic acid.H₂O | 0.055 | | | | |
| | II-68 | 5 | | | | |
| | III-35 | 85.9 | | | | |
| Ex. 70 | I-13 | 0.1 | 0.16 | 5.3 | 170 | 5.0 |
| | ACRONAL 4F | 4 | | | | |
| | p-toluenesulfonic acid.H₂O | 0.055 | | | | |
| | V-8 | 4 | | | | |
| | II-37 (A) | 40 | | | | |
| | II-46 (A) | 10 | | | | |
| | II-64 (A) | 15 | | | | |
| | II-77 (A) | 10 | | | | |
| Ex. 71 | II-17 (A) | 15 | 0.15 | 7.6 | >240 | 7.6 |
| | I-13 | 4 | | | | |
| | III-20 (A) | 10 | | | | |
| | ACRONAL 4F | 0.1 | | | | |
| | p-toluenesulfonic acid.H₂O | 0.055 | | | | |
| | V-8 | 4 | | | | |
| CEx. 5 | Same as in Example 33 except that I-13 was excluded. | | 0 | 1.9 | — | — |
| CEx. 6 | Same as in Example 34 except that I-13 was excluded. | | 0 | 1.8 | — | — |
| CEx. 7 | Same as in Example 39 except that I-13 was excluded. | | 0 | 1.2 | — | — |
| CEx. 8 | Same as in Example 33 except that (II)-69(A) and II-17(A) was omitted. | | 0 | 1.1 | — | — |
| CEx. 9 | Same as in Example 43 except that I-13 was excluded and the amount of p-toluenesulfonic acid was changed to 0.052 part. | | 0.16 | 1.1 | 10 | 1.0 |
| CEx. 10 | Same as in Example 51 except that I-13 was excluded and the amount of p-toluenesulfonic acid was changed to 0.052 part. | | 0.16 | 1.2 | 15 | 1.1 |
| CEx.11 | III-20 (A) | 90.9 | 0.16 | 1.9 | 20 | 1.1 |
| | I-13 | 5 | | | | |
| | ACRONAL 4F | 0.1 | | | | |
| | V-8 | 4 | | | | |
| | p-toluenesulfonic acid.H₂O | 0.055 | | | | |
| | III-20 (A) | 107 | | | | |
| CEx. 12 | IV-6 | 1 | 0 | 1.0 | — | — |
| | V-8 | 4 | | | | |

EXAMPLE 72

Glass bottles scratched under the aforesaid conditions were each coated at their outside surface, inside surface or inside and outside surfaces with a 40% by weight methyl ethyl ketone solution of a mixture of the components of a coating material and a silane coupling agent, and dried. The coating was then cured. The resulting bottles (24 in total) were tested for pressure-resistant strength and impact strength under the conditions described hereinabove. The results are expressed as percent increases with respect to a control (control bottles non-scratched or scratched variously). The results are shown in Table 5.

The scratching conditions are the same as described hereinabove.

TABLE 5

| | | Percent increase in pressure-resistant strength and impact (%) n = 24 | | | | | |
|---|---|---|---|---|---|---|---|
| | | Average | | | Minimum | | |
| | Coating thickness (μm) | Outside surface 3.0 | Inside surface 19 | Outside and inside surfaces 3.0:19 | Outside surface 3.0 | Inside surface 19 | Outside and inside surfaces 3.0:19 |
| Pressure-resistant strength | Non-scratched | 28 | 21 | 17 | 50 | 50 | 50 |
| | Scratched at the inside surface | 10 | 10 | 14 | 60 | 80 | 80 |

TABLE 5-continued

| | | Percent increase in pressure-resistant strength and impact (%) n = 24 | | | | | |
|---|---|---|---|---|---|---|---|
| | | Average | | | Minimum | | |
| Coating thickness (μm) | | Outside surface 3.0 | Inside surface 19 | Outside and inside surfaces 3.0:19 | Outside surface 3.0 | Inside surface 19 | Outside and inside surfaces 3.0:19 |
| | Scratched at the outside surface | 44 | 27 | 22 | 67 | 50 | 50 |
| | Scratched at the inside and outside surface | 39 | 53 | 56 | 60 | 80 | 60 |
| Impact strength | Non-scratched | 18 | 18 | 45 | 0 | 40 | 60 |
| | Scratched at the inside surface | 17 | 17 | 100 | 100 | 100 | 400 |
| | Scratched at the outside surface | 15 | 10 | 20 | 25 | 25 | 75 |
| | Scratched at the inside and outside surface | 20 | 20 | 100 | 100 | 100 | 400 |

Example 72 was repeated using the coating materials used in Examples 34 to 71 and Comparative Examples 5 to 12. The results are shown in Table 6. The results are indicated as percent increases (%) with respect to a control (a non-scratched bottle).

TABLE 6

| | | Percent increase in pressure-resistant strength and impact strength (%) n = 24 | | | | | | | | | | | | | | | | | | |
|---|---|---|---|---|---|---|---|---|---|---|---|---|---|---|---|---|---|---|---|---|
| | | Example | | | | | | | | | | | | | | | | | | |
| | | 34 | 35 | 36 | 37 | 38 | 39 | 40 | 41 | 42 | 43 | 44 | 45 | 46 | 47 | 48 | 49 | 50 | 51 | 52 |
| | Non-scratched | | | | | | | | | | | | | | | | | | | |
| Pressure-resistant strength | (average) | 30 | 29 | 30 | 21 | 23 | 20 | 8 | 24 | 30 | 40 | 40 | 42 | 43 | 42 | 43 | 44 | 47 | 49 | 49 |
| | (minimum) | 60 | 60 | 66 | 45 | 40 | 43 | 22 | 52 | 60 | 76 | 75 | 77 | 79 | 78 | 80 | 82 | 87 | 92 | 91 |
| | Scratched at the outside surface | | | | | | | | | | | | | | | | | | | |
| | (average) | 46 | 45 | 44 | 33 | 36 | 32 | 12 | 38 | 30 | 52 | 52 | 53 | 55 | 54 | 56 | 57 | 61 | 64 | 64 |
| | (minimum) | 62 | 70 | 66 | 53 | 48 | 46 | 21 | 60 | 61 | 80 | 80 | 81 | 84 | 83 | 85 | 87 | 92 | 98 | 96 |
| | Scratched at the inside and outside surfaces | | | | | | | | | | | | | | | | | | | |
| | (average) | 40 | 36 | 39 | 28 | 32 | 26 | 17 | 33 | | | | | | | | | | | |
| | (minimum) | 60 | 60 | 56 | 55 | 42 | 40 | 30 | 62 | | | | | | | | | | | |
| | Non-scratched | | | | | | | | | | | | | | | | | | | |
| | (average) | 19 | 19 | 20 | 15 | 15 | 13 | 8 | 15 | 18 | 23 | 23 | 24 | 24 | 23 | 24 | 25 | 26 | 29 | 27 |
| | (minimum) | 45 | 46 | 55 | 52 | 29 | 27 | 16 | 29 | 49 | 63 | 63 | 64 | 66 | 65 | 67 | 68 | 73 | 79 | 74 |
| | Scratched at the outside surface | | | | | | | | | | | | | | | | | | | |
| Impact strength | (average) | 17 | 15 | 16 | 12 | 14 | 11 | 8 | 14 | 16 | 19 | 19 | 20 | 20 | 19 | 22 | 21 | 22 | 24 | 23 |
| | (minimum) | 63 | 60 | 62 | 60 | 50 | 57 | 49 | 61 | 59 | 72 | 72 | 73 | 76 | 74 | 77 | 78 | 83 | 88 | 85 |
| | Scratched at the inside and outside surfaces | | | | | | | | | | | | | | | | | | | |
| | (average) | 21 | 19 | 14 | 14 | 17 | 14 | 7 | 17 | | | | | | | | | | | |
| | (minimum) | 100 | 100 | 95 | 95 | 90 | 85 | 60 | 52 | | | | | | | | | | | |

| | | Percent increase in pressure-resistant strength and impact strength (%) n = 24 | | | | | | | | | | | | | | | | | | |
|---|---|---|---|---|---|---|---|---|---|---|---|---|---|---|---|---|---|---|---|---|
| | | Example | | | | | | | | | | | | | | | | | | |
| | | 53 | 54 | 55 | 56 | 57 | 58 | 59 | 60 | 61 | 62 | 63 | 64 | 65 | 66 | 67 | 68 | 69 | 70 | 71 |
| | Non-scratched | | | | | | | | | | | | | | | | | | | |
| Pressure-resistant strength | (average) | 45 | 49 | 47 | 40 | 39 | 44 | 38 | 43 | 33 | 33 | 40 | 40 | 40 | 41 | 36 | 42 | 39 | 38 | 55 |
| | (minimum) | 84 | 91 | 89 | 75 | 74 | 82 | 72 | 81 | 63 | 62 | 75 | 76 | 74 | 77 | 69 | 80 | 73 | 70 | 101 |
| | Scratched at the outside surface | | | | | | | | | | | | | | | | | | | |
| | (average) | 59 | 64 | 63 | 52 | 50 | 57 | 50 | 56 | 44 | 44 | 53 | 52 | 52 | 53 | 48 | 55 | 52 | 49 | 70 |
| | (minimum) | 90 | 98 | 96 | 80 | 79 | 87 | 76 | 85 | 67 | 67 | 80 | 81 | 80 | 82 | 73 | 84 | 78 | 74 | 106 |
| | Scratched at the inside and outside surfaces | | | | | | | | | | | | | | | | | | | |
| | (average) | | | | | | | | | | | | | | | | | | | |
| | (minimum) | | | | | | | | | | | | | | | | | | | |
| | Non-scratched | | | | | | | | | | | | | | | | | | | |
| Impact strength | (average) | 26 | 29 | 26 | 23 | 23 | 24 | 21 | 24 | 19 | 19 | 23 | 24 | 23 | 24 | 21 | 24 | 22 | 21 | 30 |
| | (minimum) | 71 | 78 | 73 | 63 | 62 | 68 | 59 | 67 | 53 | 53 | 63 | 66 | 64 | 67 | 57 | 66 | 61 | 59 | 84 |
| | Scratched at the outside surface | | | | | | | | | | | | | | | | | | | |
| | (average) | 22 | 23 | 23 | 19 | 19 | 21 | 18 | 21 | 16 | 17 | 19 | 20 | 20 | 21 | 17 | 21 | 20 | 18 | 26 |
| | (minimum) | 81 | 88 | 86 | 72 | 71 | 78 | 68 | 77 | 60 | 60 | 72 | 73 | 73 | 74 | 66 | 77 | 70 | 68 | 96 |
| | Scratched at the inside and outside | | | | | | | | | | | | | | | | | | | |

TABLE 6-continued surfaces
(average)
(minimum)

|  |  |  | Percent increase in pressure-resistant strength and impact strength (%) n = 24 Comparative Example | | | | | | | |
|---|---|---|---|---|---|---|---|---|---|---|
|  |  |  | 5 | 6 | 7 | 8 | 9 | 10 | 11 | 12 |
|  |  | Non-scratched | | | | | | | | |
|  | Pressure-resistant strength | (average) | 7 | 7 | 4 | 2 | 8 | 7 | 10 | 0 |
|  |  | (minimum) | 2 | 0 | 0 | 0 | 2 | 0 | 13 | 0 |
|  |  | Scratched at the outside surface | | | | | | | | |
|  |  | (average) | 9 | 7 | 4 | 3 | 9 | 6 | 7 | 0 |
|  |  | (minimum) | 1 | 0 | 1 | 0 | 3 | 0 | 11 | 0 |
|  |  | Scratched at the inside and outside surfaces | | | | | | | | |
|  |  | (average) | 10 | 8 | 5 | 4 | | | | |
|  |  | (minimum) | 5 | 4 | 0 | 3 | | | | |
|  |  | Non-scratched | | | | | | | | |
|  | Impact strength | (average) | 5 | 6 | 4 | 3 | 5 | 6 | 0 | 0 |
|  |  | (minimum) | 0 | 0 | 0 | 0 | 0 | 0 | 5 | 0 |
|  |  | Scratched at the outside surface | | | | | | | | |
|  |  | (average) | 7 | 7 | 5 | 2 | 4 | 4 | 0 | 0 |
|  |  | (minimum) | 7 | 7 | 7 | 2 | 0 | 0 | 5 | 0 |
|  |  | Scratched at the inside and outside surfaces | | | | | | | | |
|  |  | (average) | 4 | 3 | 3 | 2 | | | | |
|  |  | (minimum) | 4 | 3 | 3 | 3 | | | | |

EXAMPLE 73

As in Examples 1 to 31 glass plates and bottles were each treated with a solution of a silane coupling agent in the form of (b) in Examples 1 to 31. Then, each of the coating materials shown in Table 7, as a solution containing 40% by weight of the active components, was applied to the glass plates and bottles, and the properties of the coated glass plates and bottles were measured. Table 7 shows the 3-point flexural break strengths of the coated glass plates, and Table 8, the percent increases of pressure-resistant strengths and impact strengths of the glass bottles coated with the coating materials at the outside surface.

TABLE 8

|  | Coating thickness (μm) | Percent increase in pressure-resistant strength and impact strength (%) | |
|---|---|---|---|
|  |  | Average 3 | Minimum 3 |
| Pressure resistant strength | Non-scratched | 67 | 125 |
|  | Scratched at the outside surface | 87 | 130 |
| Impact strength | Non-scratched | 75 | 130 |
|  | Scratched at the outside surface | 80 | 145 |

EXAMPLE 74

The outside surfaces of 300 ml. glass bottles were coated with the coating materials used in Examples 1 to 31 and 33 to 71 to a thickness of 3 micrometers. The coated bottles were loaded into an automatic vendor,

TABLE 7

| Example | Treatment with silane coupling agent | | Coating material | | | Relative value of 3-point flexural break strength | Hot water resistance test | |
|---|---|---|---|---|---|---|---|---|
|  | Structure of the coupling agent | Form of the coupling agent solution | Ingredient | Amount (parts) | Acid value |  | Peeling time (min.) | Relative value of 3-point flexural break strength |
| 73 | I-13 | (b) | II-41 (A) | 40 | 0.16 | 6.8 | >240 | 6.8 |
|  |  |  | II-46 (A) | 10 | | | | |
|  |  |  | II-76 (A) | 10 | | | | |
|  |  |  | II-17 (A) | 15 | | | | |
|  |  |  | II-64 (A) | 15.9 | | | | |
|  |  |  | III-12 (A) | 5 | | | | |
|  |  |  | MEGAFAC F-177 | 0.1 | | | | |
|  |  |  | V-8 | 4 | | | | |
|  |  |  | p-toluenesulfonic acid.$H_2O$ | 0.055 | | | | | and the ratio of breakage was examined. The ratio of breakage of these bottles and that of bottles obtained by applying a heat-shrinkable film (50 micrometers thick) to the coated bottles were much lower than that of a control bottle.

On the other hand, when the coating materials used in Comparative Examples 1 to 4 and 6 to 12 were applied, there was hardly any improvement in the ratio of breakage.

COMPARATIVE EXAMPLE 13

A urethane resin solution or an aqueous latex generally used to prevent scattering in the glass bottle industry was coated on the same glass as used in the Examples, and dried at 70° C. to form a film. The coated glass was subjected to the same flexural strength test as in Examples 1 to 31. The relative value was 1.0, and no increase in dynamical strength was noted.

COMPARATIVE EXAMPLE 14

Glass bottles for holding carbonated drinks (weight 580 g, capacity 1000 ml) produced by Yamamura Glass Co., Ltd. are shipped to the users after they have been coated with a solvent-free, non-yellowing urethane resin in their outside surface to a thickness of 200 micrometers to prevent glass fragment scattering.

Two lots of these bottles were subjected to pressure-resistant strength test as described hereinabove. The results are shown as a percent increase to a control bottle.

TABLE 9

|  | Average | Minimum |
|---|---|---|
| Lot A | 13 | 9 |
| Lot B | 12 | 0 |

The results given in Table 11 shows that the coating material in accordance with this invention markedly increases the pressure-resistant strength and impact strength of glass bottles. In particular, the increase of the pressure-resistant strength is a marked effect not obtained heretofore.

Since the pressure-resistant strength and impact strength of glass containers can be markedly increased by the method of this invention, the thickness of glass can be reduced while maintaining these dynamical strengths of glass at equal or higher values. This, in turn, makes it possible to reduce the cost of the raw materials and the weight of the glass containers. Furthermore, as a result of the increase of dynamical strengths by the method of this invention, glass bottles can be expected to find application in automatic ventors of carbonated drinks and the like and to provoke an increased demand.

Generally, in the production of glass containers, various chemical strengthening treatments are applied to glass bottles at high temperatures immediately after molding in order to impart dynamical strengths. After annealing the glass bottles, a surface-active agent and the like are coated on the surfaces of the bottles in order to avoid scratching by impact or friction which may lead to the reduction of dynamical strengths. If, in accordance with this invention, a step of applying a coating material on the surface of glass bottles in accordance with this invention, the step of increasing the dynamical strengths of glass container and the step of preventing scratching can be omitted, and the productivity of glass containers can be increased and the cost of product, curtailed.

In the production facilities of glass bottles, products of unacceptable dynamical strengths have occurred. Since the method of the present invention can increase the pressure-resistant strength and impact strength of these bottles to levels above certain limits, and economical advantage of increasing the quality and yield of glass bottles can be obtained.

Since the coating material in accordance with this invention is usually liquid and can be diluted with a solvent of a desired viscosity, not only glass bottles but other glass articles of complex shapes can be coated with it. Furthermore, because activated energy rays can permeate the interior or glass articles of complex shapes, a cured coating of the coating material may be formed on glass articles of various shapes. Hence, use of the coating material in accordance with invention permits increasing of the pressure-resistant strength and impact strength of many glass articles irrespective of the shape of their size, thickness and shape (e.g., in the shape of a film, a plate, a rod, a sphere, a line or a combination of these).

Furthermore, a pigment or a dye can be incorporated in the coating material used in this invention, and the method of this invention can color glass bottles in various colors. In the conventional process, considerably time is required for changing colors and product losses also occur during this time. The method of this invention can also solve this problem.

What is claimed is:

1. A method of increasing the pressure-resistant strength and impact strength of a glass container, which consists essentially of treating the surface of the glass container with a silane coupling agent, applying a coating material consisting essentially of a reactive compound having at least two (meth)acryloyl groups in the molecule to the treated glass container, and subjecting it to irradiation of an activated energy ray to cure the coating material applied.

2. The method of claim 1 wherein the activated energy ray is ultraviolet light.

3. The method of claim 1 wherein the reactive compound having at least two (meth)acryloyl groups in the molecule is a polyvalent (meth)acrylate resulting from bonding of at least two (meth)acrylic acids to a polyhydric alcohol, or an epoxy-modified (meth)acrylate resulting from esterification of the epoxy groups of an epoxy compound having at least two epoxy groups with (meth)acrylic acid.

4. The method of claim 1 wherein the reactive compound having at least two (meth)acryloyl groups in the molecule is at least one compound selected from the group consisting of compounds represented by the following formula (a)
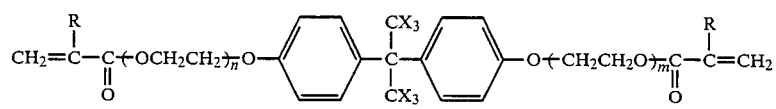

wherein R represents H, F or CH₃, n and m are integers satisfying $2 \leq n+m \leq 10$ and may be identical or different, and X is H or F,
compounds represented by the following formula

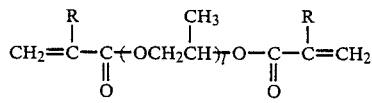

wherein R and l are as defined above,
compounds represented by the following formula (c)
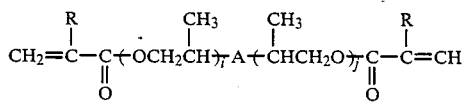

wherein A is $-O-CH_2CH_2O-_k$, $-OCH_2CH_2CH_2CH_2O-$,

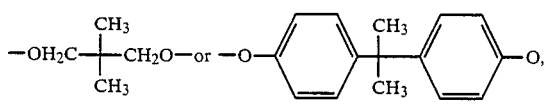

i, j and k are an integer of 1 to 10, and R is as defined above,
compounds represented by the following formula (d)
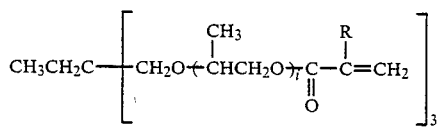

wherein R and i are as defined,
compounds represented by the following formula (e)
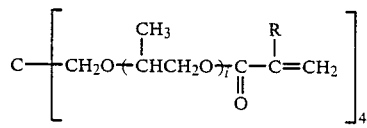

wherein R and i are as defined above,
compounds represented by the following formula (f)
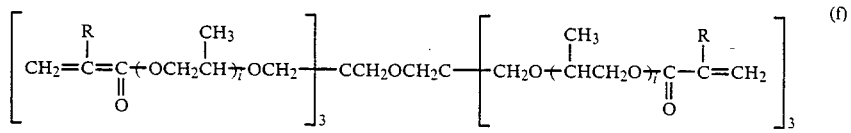

wherein R and i are as defined,
compounds represented by the following formula (g)

wherein R is as defined,
compounds represented by the following formula (h)
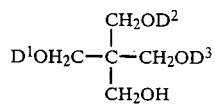

wherein $D^1$ to $D^3$ represent a hydrogen atom or a (meth)acryloyl group, and at least two of $D^1$ to $D^3$ are (meth)acryloyl groups,
compounds represented by the following formula (i)
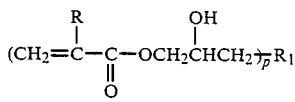

wherein R is as defined, p is an integer of 2 to 5, and $R_1$ is a group selected from aliphatic and aromatic groups,
compounds represented by the following formula (j)
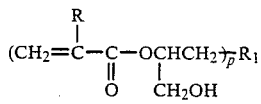

wherein R, p and $R_1$ are as defined above.

5. The method of claim 1 wherein the silane coupling agent is an organic silicon monomer reactive groups.

6. The method of claim 1 wherein the silane compound agent is an organic silicon monomer having at least two different reactive groups, and one of the reactive groups can react with glass, and the other reactive group is reactive with a (meth)acryloyl group.

7. The method of claim 1 wherein the silane coupling agent is in the form of a solution having a pH of 3 to 5.

8. The method of claim 1 wherein the coating material has an acid value of 0.01 to 100.

9. A method of increasing the pressure-resistant strength and impact strength of a glass container, which consists essentially of applying a coating material consisting essentially of a silane coupling agent and a reactive compound having at least two (meth)acryloyl groups in the molecule to the surface of the glass article, and then subjecting the coated glass container to irradiation of an activated energy ray to cure the coating.

10. The method of claim 9 wherein the activated energy ray is ultraviolet light.

11. The method of claim 9 wherein the reactive compound having at least two (meth)acryloyl groups in the molecule is a polyvalent (meth)acrylate resulting from bonding of at least two (meth)acrylic acids to a polyhydric alcohol, or an epoxy-modified (meth)acrylate resulting from esterification of the epoxy groups of an epoxy compound having at least two epoxy groups with (meth)acrylic acid.

12. The method of claim 9 wherein the reactive compound having at least two (meth)acryloyl groups in the molecule is at least one compound selected from the group consisting of
compounds represented by the following formula

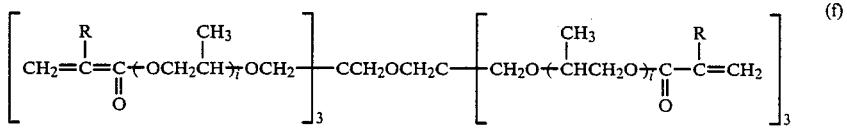
(a)

wherein R represents H, F or $CH_3$; n and m are integers satisfying $2 \leq n+m \leq 10$ and may be identical or different, and X is H or F,
compounds represented by the following formula

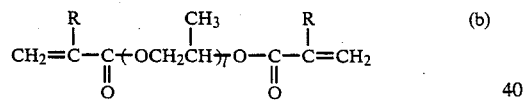
(b)

wherein R and l are as defined above,
compounds represented by the following formula

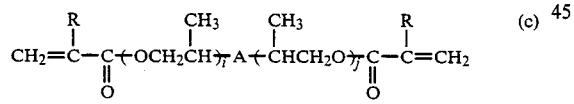
(c)

wherein A is $-O+CH_2CH_2O+_k$, $-OCH_2CH_2CH_2CH_2O-$,

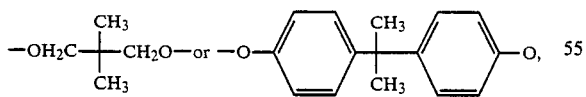

i, j and k are an integer of 1 to 10, and R is as defined above.
compounds represented by the following formula

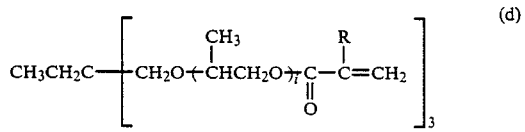
(d)

wherein R and i are as defined,
compounds represented by the following formula

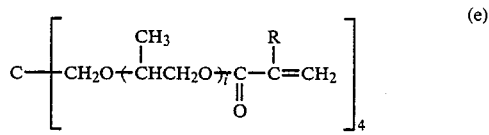
(e)

wherein R and i are as defined above,
compound represented by the following formula

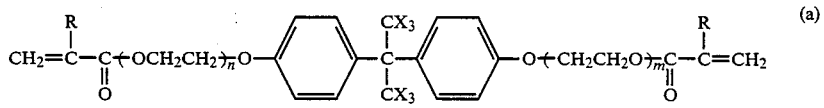 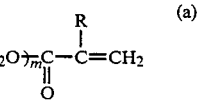
(f)

wherein R and i are as defined,
compounds represented by the following formula

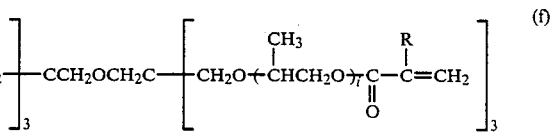
(g)

wherein R is as defined,
compounds represented by the following formula

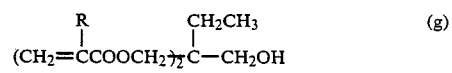
(h)

wherein $D^1$ to $D^3$ represent a hydrogen atom or a (meth)acryloyl group, and at least two of $D^1$ to $D^3$ are (meth)acryloyl groups,
compounds represented by the following formula

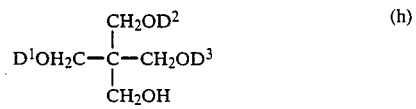
(i)

wherein R is as defined, p is an integer of 2 to 5, and $R_1$ is a group selected from aliphatic and aromatic groups,
compounds represented by the following formula

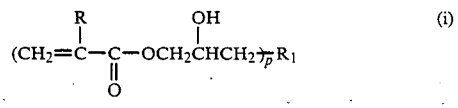
(j)

wherein R, p and $R_1$ are as defined above.

13. The method of claim 9 wherein the silane coupling agent is an organic silicon monomer reactive groups.

14. The method of claim 9 wherein the silane compound agent is an organic silicon monomer having at least two different reactive groups, and one of the reactive groups can react with glass, and the other reactive group is reactive with a (meth)acryloyl group.

15. The method of claim 9 wherein the coating material has an acid value of 0.01 to 100.

16. A method of increasing the pressure-resistant strength and impact strength of a glass container, which consists essentially of treating the surface of the glass container with a silane coupling agent, applying a coating material consisting essentially of a reactive compound having at least two (meth)acryloyl groups in the molecule and an oil-soluble fluorine-containing surface-active agent to the treated glass container, and subjecting it to irradiation of an activated energy ray to cure the coating material applied.

17. A method of increasing the pressure-resistant strength and impact strength of a glass container, which consists essentially of applying a coating material consisting essentially of a silane coupling agent, an oil-soluble fluorine-containing surface-active agent and a reactive compound having at least two (meth)acryloyl groups in the molecule to the surface of the glass article, and then subjecting the coated glass container to irradiation of an activated energy ray to cure the coating.

* * * * *

UNITED STATES PATENT AND TRADEMARK OFFICE
CERTIFICATE OF CORRECTION

PATENT NO. : 4,891,241
DATED : January 2, 1990
INVENTOR(S) : YUTAKA HASHIMOTO ET AL.

It is certified that error appears in the above-identified patent and that said Letters Patent is hereby corrected as shown below: Column 43, line 27:

Claim 4, line 22 of the claim, "$-O-CH_2CH_2O-_k$" should read --$O-(CH_2CH_2O)_k$--.

Column 43, line 13, under the word "formula" insert --(b)--.

Signed and Sealed this

Third Day of December, 1991

Attest:

HARRY F. MANBECK, JR.

*Attesting Officer*      *Commissioner of Patents and Trademarks*

Adverse Decisions In Interference

Patent No. 4,891,241, Yutaka Hashimoto, Masanobu Yumoto, Toshihiko Umaba, Yutaka Kamada, Tsutomu Matsubara, Sigeo Kawaguchi, METHOD OF INCREASING THE DYNAMICAL STRENGTH OF GLASS CONTAINER, Interference No. 103,224, final judgement adverse to the patentees rendered November 30, 1999, as to claims 1-15.

*(Official Gazette May 2, 2000)*